(12) United States Patent
Cummins et al.

(10) Patent No.: US 7,650,575 B2
(45) Date of Patent: Jan. 19, 2010

(54) RICH DRAG DROP USER INTERFACE

(75) Inventors: Charles Cummins, Seattle, WA (US); Cornelis K. Van Dok, Bellevue, WA (US); David G. De Vorchik, Seattle, WA (US); Stephan Hoefnagels, Seattle, WA (US); Timothy P. McKee, Seattle, WA (US); Tyler K. Beam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1112 days.

(21) Appl. No.: 11/179,804

(22) Filed: Jul. 13, 2005

(65) Prior Publication Data

US 2006/0070007 A1   Mar. 30, 2006

Related U.S. Application Data

(63) Continuation-in-part of application No. 10/440,035, filed on May 16, 2003, now Pat. No. 7,162,466, which is a continuation-in-part of application No. 10/403,341, filed on Mar. 27, 2003.

(51) Int. Cl.
*G06F 3/048* (2006.01)
(52) U.S. Cl. .................................................. 715/769
(58) Field of Classification Search ................ 715/739, 715/769, 770
See application file for complete search history.

(56) References Cited

U.S. PATENT DOCUMENTS 4,881,179 A   11/1989   Vincent
5,060,135 A   10/1991   Levine et al.
5,241,671 A   8/1993    Reed et al.

(Continued)

FOREIGN PATENT DOCUMENTS

CN   1421800   11/2001

(Continued)

OTHER PUBLICATIONS

Langer, Maria, Mac OS X: Visual QuickStart Guide; Apr. 2001, Peachpit Press, Mac OS X Disk Organization (pp. 1-3), Views (pp. 1-11), Outlines (1-3).

(Continued)

*Primary Examiner*—Thanh T Vu
(74) *Attorney, Agent, or Firm*—Shook Hardy & Bacon LLP

(57) ABSTRACT

In an electronic file system, preview information is provided to the user during a drag operation of a selected object onto a target object. The information indicates what type(s) of action is to be taken should the selected object be dropped onto the target object. The action(s) to be taken may depend upon the type of the selected object and/or the type of the target object. For example, where the selected object is an item and the target object is a persisted auto-list, the action may include adding, removing, or modifying one or more properties of the selected object to conform to one or more criteria defined by the persisted auto-list. Also, numerical feedback may be provided to the user where multiple objects are selected. For example, where seven objects are selected, the textual number "7" may appear next to the cursor.

16 Claims, 10 Drawing Sheets

U.S. PATENT DOCUMENTS

| | | | |
|---|---|---|---|
| 5,297,250 A | 3/1994 | Leroy et al. |
| 5,327,529 A | 7/1994 | Fults et al. |
| 5,333,266 A | 7/1994 | Boaz et al. |
| 5,333,315 A | 7/1994 | Saether et al. |
| 5,388,196 A | 2/1995 | Pajak et al. |
| 5,420,605 A | 5/1995 | Vouri et al. |
| 5,461,710 A | 10/1995 | Bloomfield et al. |
| 5,499,364 A | 3/1996 | Klein et al. |
| 5,504,852 A | 4/1996 | Thompson-Rohrlich |
| 5,513,306 A | 4/1996 | Mills et al. |
| 5,544,360 A | 8/1996 | Lewak et al. |
| 5,546,527 A * | 8/1996 | Fitzpatrick et al. ........... 715/769 |
| 5,550,852 A | 8/1996 | Patel et al. |
| 5,559,948 A | 9/1996 | Bloomfield et al. |
| 5,583,982 A | 12/1996 | Matheny et al. |
| 5,590,259 A | 12/1996 | Anderson et al. |
| 5,596,702 A | 1/1997 | Stucka et al. |
| 5,598,524 A | 1/1997 | Johnston, Jr. et al. |
| 5,600,778 A | 2/1997 | Swanson et al. |
| 5,606,669 A | 2/1997 | Bertin et al. |
| 5,625,783 A | 4/1997 | Ezekiel et al. |
| 5,630,042 A | 5/1997 | McIntosh et al. |
| 5,648,795 A | 7/1997 | Vouri |
| 5,652,876 A | 7/1997 | Ashe et al. |
| 5,675,520 A | 10/1997 | Pitt, III et al. |
| 5,680,563 A | 10/1997 | Edelman |
| 5,696,486 A | 12/1997 | Poliquin et al. |
| 5,696,914 A | 12/1997 | Nahaboo et al. |
| 5,710,926 A | 1/1998 | Maurer |
| 5,757,925 A | 5/1998 | Faybishenko |
| 5,760,770 A | 6/1998 | Bliss et al. |
| 5,790,121 A | 8/1998 | Sklar et al. |
| 5,802,516 A | 9/1998 | Shwarts et al. |
| 5,831,606 A | 11/1998 | Nakajima et al. |
| 5,835,094 A | 11/1998 | Ermel et al. |
| 5,838,317 A | 11/1998 | Bolnick et al. |
| 5,838,322 A | 11/1998 | Nakajima et al. |
| 5,855,446 A | 1/1999 | Disborg |
| 5,867,163 A | 2/1999 | Kurtenbach |
| 5,870,088 A | 2/1999 | Washington et al. |
| 5,875,446 A | 2/1999 | Brown et al. |
| 5,875,448 A | 2/1999 | Boys |
| 5,878,410 A | 3/1999 | Zbikowski et al. |
| 5,886,694 A | 3/1999 | Breinberg et al. |
| 5,899,995 A | 5/1999 | Millier et al. |
| 5,905,973 A | 5/1999 | Yonezawa et al. |
| 5,907,703 A | 5/1999 | Kronenberg et al. |
| 5,907,837 A | 5/1999 | Ferrel et al. |
| 5,909,540 A | 6/1999 | Carter et al. |
| 5,923,328 A | 7/1999 | Griesmer |
| 5,929,854 A | 7/1999 | Ross |
| 5,930,801 A | 7/1999 | Falkenhainer et al. |
| 5,933,139 A | 8/1999 | Feigner et al. |
| 5,935,210 A | 8/1999 | Stark |
| 5,973,686 A | 10/1999 | Shimogori et al. |
| 5,987,454 A | 11/1999 | Hobbs |
| 5,987,506 A | 11/1999 | Carter et al. |
| 6,003,040 A | 12/1999 | Mital et al. |
| 6,008,806 A | 12/1999 | Nakajima et al. |
| 6,014,137 A | 1/2000 | Burns |
| 6,016,692 A | 1/2000 | Schaenzer et al. |
| 6,021,262 A | 2/2000 | Cote et al. |
| 6,023,708 A | 2/2000 | Mendez et al. |
| 6,024,843 A | 2/2000 | Anderson et al. |
| 6,025,843 A | 2/2000 | Sklar |
| 6,037,944 A | 3/2000 | Hugh |
| 6,055,540 A | 4/2000 | Snow et al. |
| 6,055,543 A | 4/2000 | Christensen |
| 6,061,059 A | 5/2000 | Taylor et al. |
| 6,061,692 A | 5/2000 | Thomas et al. |
| 6,061,695 A | 5/2000 | Slivka et al. |
| 6,065,012 A | 5/2000 | Balsara et al. |
| 6,078,924 A | 6/2000 | Ainsbury et al. |
| 6,097,389 A | 8/2000 | Morris et al. |
| 6,101,509 A | 8/2000 | Hanson et al. |
| 6,144,968 A | 11/2000 | Zellweger |
| 6,147,601 A | 11/2000 | Sandelman et al. |
| 6,160,552 A * | 12/2000 | Wilsher et al. ............... 715/739 |
| 6,175,364 B1 | 1/2001 | Wong et al. |
| 6,181,342 B1 | 1/2001 | Niblack |
| 6,202,061 B1 | 3/2001 | Khosla et al. |
| 6,216,122 B1 | 4/2001 | Elson |
| 6,237,004 B1 | 5/2001 | Dodson et al. |
| 6,237,011 B1 | 5/2001 | Ferguson et al. |
| 6,240,407 B1 | 5/2001 | Chang et al. |
| 6,240,421 B1 | 5/2001 | Stolarz |
| 6,243,094 B1 | 6/2001 | Sklar |
| 6,243,724 B1 | 6/2001 | Mander et al. |
| 6,246,411 B1 | 6/2001 | Strauss |
| 6,256,031 B1 | 7/2001 | Meijer et al. |
| 6,268,852 B1 | 7/2001 | Lindhorst et al. |
| 6,275,829 B1 | 8/2001 | Angiulo et al. |
| 6,279,016 B1 | 8/2001 | De Vorchik et al. |
| 6,301,586 B1 | 10/2001 | Yang et al. |
| 6,308,173 B1 | 10/2001 | Glasser et al. |
| 6,317,142 B1 | 11/2001 | Decoste et al. |
| 6,324,541 B1 | 11/2001 | De L'etraz |
| 6,324,551 B1 | 11/2001 | Lamping et al. |
| 6,326,953 B1 | 12/2001 | Wana |
| 6,330,007 B1 | 12/2001 | Isreal et al. |
| 6,339,767 B1 | 1/2002 | Rivette et al. |
| 6,341,280 B1 | 1/2002 | Glass et al. |
| 6,342,907 B1 | 1/2002 | Petty et al. |
| 6,356,863 B1 | 3/2002 | Sayle |
| 6,356,915 B1 | 3/2002 | Chtchetkine et al. |
| 6,363,377 B1 | 3/2002 | Kravets et al. |
| 6,363,400 B1 | 3/2002 | Chtchetkine et al. |
| 6,369,840 B1 | 4/2002 | Barnett et al. |
| 6,377,283 B1 | 4/2002 | Thomas et al. |
| 6,401,097 B1 | 6/2002 | McCotter et al. |
| 6,405,265 B1 | 6/2002 | Kronenberg et al. |
| 6,408,298 B1 | 6/2002 | Van et al. |
| 6,411,311 B1 | 6/2002 | Rich et al. |
| 6,425,120 B1 | 7/2002 | Morganelli et al. |
| 6,425,121 B1 | 7/2002 | Phillips et al. |
| 6,430,575 B1 | 8/2002 | Dourish et al. |
| 6,437,807 B1 | 8/2002 | Berquist et al. |
| 6,438,590 B1 | 8/2002 | Gartner et al. |
| 6,448,985 B1 | 9/2002 | McNally |
| 6,453,311 B1 | 9/2002 | Powers, III |
| 6,453,319 B1 | 9/2002 | Mattis et al. |
| 6,462,762 B1 | 10/2002 | Ku |
| 6,466,228 B1 | 10/2002 | Ulrich et al. |
| 6,466,238 B1 | 10/2002 | Berry et al. |
| 6,466,932 B1 | 10/2002 | Dennis et al. |
| 6,470,344 B1 | 10/2002 | Kothuri et al. |
| 6,473,100 B1 | 10/2002 | Beaumont et al. |
| 6,480,835 B1 | 11/2002 | Light |
| 6,483,525 B1 * | 11/2002 | Tange ........................ 715/765 |
| 6,505,233 B1 | 1/2003 | Hanson et al. |
| 6,513,038 B1 | 1/2003 | Hasegawa et al. |
| 6,519,612 B1 | 2/2003 | Howard et al. |
| 6,526,399 B1 | 2/2003 | Coulson et al. |
| 6,535,229 B1 | 3/2003 | Kraft |
| 6,535,230 B1 | 3/2003 | Celik |
| 6,539,399 B1 | 3/2003 | Hazama et al. |
| 6,544,295 B1 | 4/2003 | Bodnar et al. |
| 6,549,217 B1 | 4/2003 | De Greef et al. |
| 6,549,916 B1 | 4/2003 | Sedlar |
| 6,563,514 B1 | 5/2003 | Samar |
| 6,571,245 B2 | 5/2003 | Huang et al. |
| 6,573,906 B1 | 6/2003 | Harding et al. |
| 6,573,907 B1 | 6/2003 | Madrane |
| 6,583,799 B1 | 6/2003 | Manolis et al. |

| | | |
|---|---|---|
| 6,590,585 B1 | 7/2003 | Suzuki et al. |
| 6,606,105 B1 | 8/2003 | Quartetti |
| 6,613,101 B2 | 9/2003 | Mander et al. |
| 6,628,309 B1 | 9/2003 | Dodson et al. |
| 6,636,238 B1 | 10/2003 | Amir et al. |
| 6,636,250 B1 | 10/2003 | Gasser |
| 6,638,313 B1 | 10/2003 | Freeman et al. |
| 6,658,406 B1 | 12/2003 | Mazner et al. |
| 6,662,198 B2 | 12/2003 | Satyanarayanan et al. |
| 6,684,222 B1 | 1/2004 | Cornelius et al. |
| 6,721,760 B1 | 4/2004 | Ono et al. |
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,626 B2 | 6/2004 | Brown et al. |
| 6,754,829 B1 | 6/2004 | Butt et al. |
| 6,760,721 B1 | 7/2004 | Chasen et al. |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,948,120 B1 | 9/2005 | Delgobbo et al. |
| 6,950,818 B2 | 9/2005 | Dennis et al. |
| 6,950,989 B2 | 9/2005 | Rosenzweig et al. |
| 6,952,714 B2 | 10/2005 | Peart |
| 6,952,724 B2 | 10/2005 | Prust |
| 6,980,993 B2 | 12/2005 | Horvitz et al. |
| 7,010,755 B2 | 3/2006 | Anderson et al. |
| 7,024,427 B2 | 4/2006 | Bobbitt et al. |
| 7,028,262 B2 | 4/2006 | Estrada et al. |
| 7,043,472 B2 | 5/2006 | Aridor et al. |
| 7,047,498 B2 | 5/2006 | Lui et al. |
| 7,051,291 B2 | 5/2006 | Sciammarella et al. |
| 7,062,500 B1 | 6/2006 | Hall et al. |
| 7,062,718 B2 | 6/2006 | Kodosky et al. |
| 7,068,291 B1 | 6/2006 | Roberts et al. |
| 7,100,150 B2 | 8/2006 | Polk |
| 7,106,843 B1 | 9/2006 | Gainsboro |
| 7,139,811 B2 | 11/2006 | Lev Ran et al. |
| 7,149,729 B2 | 12/2006 | Kaasten et al. |
| 7,168,051 B2 | 1/2007 | Robinson et al. |
| 7,194,743 B2 | 3/2007 | Hayton et al. |
| 7,203,948 B2 | 4/2007 | Mukundan et al. |
| 7,216,289 B2 | 5/2007 | Kagle |
| 7,216,301 B2 | 5/2007 | Moehrle |
| 7,219,302 B1 | 5/2007 | O'Shaughnessy et al. |
| 7,240,292 B2 | 7/2007 | Hally et al. |
| 7,243,334 B1 | 7/2007 | Berger et al. |
| 7,275,063 B2 | 9/2007 | Horn |
| 7,290,245 B2 | 10/2007 | Skjolsvold |
| 7,293,031 B1 | 11/2007 | Dusker et al. |
| 7,383,494 B2 | 6/2008 | Krolczyk et al. |
| 7,409,382 B2 | 8/2008 | Kido |
| 7,415,484 B1 | 8/2008 | Tulkoff et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087652 A1 | 7/2002 | Davis et al. |
| 2002/0087696 A1 | 7/2002 | Brunheroto et al. |
| 2002/0087740 A1 | 7/2002 | Castanho et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0149888 A1 | 10/2002 | Motonishi et al. |
| 2002/0152262 A1 | 10/2002 | Arkin et al. |
| 2002/0152267 A1 | 10/2002 | Lennon |
| 2002/0156756 A1 | 10/2002 | Stanley et al. |
| 2002/0156895 A1 | 10/2002 | Brown |
| 2002/0161800 A1 | 10/2002 | Eld et al. |
| 2002/0163572 A1 | 11/2002 | Center et al. |
| 2002/0169678 A1 | 11/2002 | Chao et al. |
| 2002/0174329 A1 | 11/2002 | Bowler et al. |
| 2002/0181398 A1 | 12/2002 | Szlam |
| 2002/0184357 A1 | 12/2002 | Traversat et al. |
| 2002/0188605 A1 | 12/2002 | Adya et al. |
| 2002/0188621 A1 | 12/2002 | Flank et al. |
| 2002/0188735 A1 | 12/2002 | Needham et al. |
| 2002/0194252 A1 | 12/2002 | Powers, III |
| 2002/0196276 A1 | 12/2002 | Corl et al. |
| 2002/0199061 A1 | 12/2002 | Friedman et al. |
| 2003/0001964 A1 | 1/2003 | Masukura et al. |

| | | | | | |
|---|---|---|---|---|---|
| 2003/0009484 A1 | 1/2003 | Hamanaka et al. | 2004/0059755 A1 | 3/2004 | Farrington |
| 2003/0014415 A1 | 1/2003 | Weiss et al. | 2004/0068524 A1 | 4/2004 | Aboulhosn et al. |
| 2003/0018657 A1 | 1/2003 | Monday | 2004/0070612 A1 | 4/2004 | Sinclair et al. |
| 2003/0018712 A1 | 1/2003 | Harrow et al. | 2004/0073705 A1 | 4/2004 | Robert, Jr. |
| 2003/0028610 A1 | 2/2003 | Pearson | 2004/0083433 A1 | 4/2004 | Takeya |
| 2003/0033367 A1 | 2/2003 | Itoh | 2004/0085581 A1 | 5/2004 | Tonkin |
| 2003/0037060 A1 | 2/2003 | Kuehnel | 2004/0088374 A1 | 5/2004 | Webb et al. |
| 2003/0041178 A1 | 2/2003 | Brouk et al. | 2004/0091175 A1 | 5/2004 | Beyrouti |
| 2003/0046260 A1 | 3/2003 | Satyanarayanan et al. | 2004/0098370 A1 | 5/2004 | Garland et al. |
| 2003/0063124 A1 | 4/2003 | Melhem et al. | 2004/0098379 A1 | 5/2004 | Huang |
| 2003/0069893 A1 | 4/2003 | Kanai et al. | 2004/0098742 A1 | 5/2004 | Hsieh et al. |
| 2003/0069908 A1 | 4/2003 | Anthony et al. | 2004/0103073 A1 | 5/2004 | Blake et al. |
| 2003/0074356 A1 | 4/2003 | Kaier et al. | 2004/0103280 A1 | 5/2004 | Balfanz et al. |
| 2003/0076322 A1 | 4/2003 | Ouzts et al. | 2004/0105127 A1 | 6/2004 | Cudd |
| 2003/0078918 A1 | 4/2003 | Souvignier et al. | 2004/0117358 A1 | 6/2004 | Von Kaenel et al. |
| 2003/0079038 A1 | 4/2003 | Robbin et al. | 2004/0117405 A1 | 6/2004 | Short |
| 2003/0081002 A1 | 5/2003 | De Vorchik et al. | 2004/0128322 A1 | 7/2004 | Nagy |
| 2003/0081007 A1 | 5/2003 | Cyr et al. | 2004/0133572 A1 | 7/2004 | Bailey et al. |
| 2003/0084425 A1 | 5/2003 | Glaser | 2004/0133588 A1 | 7/2004 | Kiessig et al. |
| 2003/0085918 A1 | 5/2003 | Beaumont et al. | 2004/0133845 A1 | 7/2004 | Forstall |
| 2003/0093321 A1 | 5/2003 | Bodmer et al. | 2004/0142749 A1 | 7/2004 | Ishimaru et al. |
| 2003/0093531 A1 | 5/2003 | Yeung et al. | 2004/0143349 A1 | 7/2004 | Roberts |
| 2003/0093580 A1 | 5/2003 | Thomas et al. | 2004/0148434 A1 | 7/2004 | Matsubara et al. |
| 2003/0097361 A1 | 5/2003 | Huang et al. | 2004/0153451 A1 | 8/2004 | Phillips et al. |
| 2003/0098881 A1 | 5/2003 | Nolte et al. | 2004/0153968 A1 | 8/2004 | Ching et al. |
| 2003/0098893 A1 | 5/2003 | Makinen et al. | 2004/0167942 A1 | 8/2004 | Oshinsky et al. |
| 2003/0101200 A1 | 5/2003 | Koyama et al. | 2004/0168118 A1 | 8/2004 | Wong |
| 2003/0105745 A1 | 6/2003 | Davidson et al. | 2004/0174396 A1 | 9/2004 | Jobs et al. |
| 2003/0107597 A1 | 6/2003 | Jameson | 2004/0177116 A1 | 9/2004 | McConn et al. |
| 2003/0110188 A1 | 6/2003 | Howard et al. | 2004/0177148 A1 | 9/2004 | Tsimelzon, Jr. |
| 2003/0115218 A1 | 6/2003 | Bobbitt et al. | 2004/0177319 A1 | 9/2004 | Horn |
| 2003/0117403 A1 | 6/2003 | Park et al. | 2004/0181516 A1 | 9/2004 | Ellwanger |
| 2003/0117422 A1 | 6/2003 | Hiyama et al. | 2004/0183824 A1 | 9/2004 | Benson et al. |
| 2003/0120678 A1 | 6/2003 | Hill | 2004/0189704 A1 | 9/2004 | Walsh et al. |
| 2003/0120928 A1 | 6/2003 | Cato et al. | 2004/0189707 A1 | 9/2004 | Moore et al. |
| 2003/0120952 A1 | 6/2003 | Tarbotton et al. | 2004/0193594 A1 | 9/2004 | Moore et al. |
| 2003/0122873 A1 | 7/2003 | Dieberger et al. | 2004/0193599 A1 | 9/2004 | Liu et al. |
| 2003/0126136 A1 | 7/2003 | Omoigui | 2004/0193600 A1 | 9/2004 | Kaasten et al. |
| 2003/0126212 A1 | 7/2003 | Morris et al. | 2004/0193621 A1 | 9/2004 | Moore et al. |
| 2003/0135495 A1 | 7/2003 | Vagnozzi | 2004/0193672 A1 | 9/2004 | Samji et al. |
| 2003/0135513 A1 | 7/2003 | Quinn | 2004/0193673 A1 | 9/2004 | Samji et al. |
| 2003/0135517 A1 | 7/2003 | Kauffman | 2004/0199507 A1 | 10/2004 | Tawa |
| 2003/0135659 A1 | 7/2003 | Bellotti et al. | 2004/0205168 A1 | 10/2004 | Asher |
| 2003/0140115 A1 | 7/2003 | Mehra | 2004/0205625 A1 | 10/2004 | Banatwala et al. |
| 2003/0154185 A1 | 8/2003 | Suzuki et al. | 2004/0205633 A1 | 10/2004 | Martinez et al. |
| 2003/0158855 A1 | 8/2003 | Farnham et al. | 2004/0205698 A1 | 10/2004 | Schliesmann et al. |
| 2003/0177422 A1 | 9/2003 | Tararoukhine et al. | 2004/0215600 A1 | 10/2004 | Aridor et al. |
| 2003/0184587 A1 | 10/2003 | Ording et al. | 2004/0220899 A1 | 11/2004 | Barney et al. |
| 2003/0195950 A1 | 10/2003 | Huang et al. | 2004/0223057 A1 | 11/2004 | Oura et al. |
| 2003/0210281 A1 | 11/2003 | Ellis et al. | 2004/0225650 A1 | 11/2004 | Cooper et al. |
| 2003/0212664 A1 | 11/2003 | Breining | 2004/0230572 A1 | 11/2004 | Omoigui |
| 2003/0212680 A1 | 11/2003 | Bates et al. | 2004/0230599 A1 | 11/2004 | Moore et al. |
| 2003/0212710 A1 | 11/2003 | Guy | 2004/0230917 A1 | 11/2004 | Bales et al. |
| 2003/0222915 A1 | 12/2003 | Marion et al. | 2004/0233235 A1 | 11/2004 | Rubin |
| 2003/0225796 A1 | 12/2003 | Matsubara | 2004/0243597 A1 | 12/2004 | Jensen et al. |
| 2003/0227480 A1 | 12/2003 | Polk | 2004/0249902 A1 | 12/2004 | Tadayon et al. |
| 2003/0227487 A1 | 12/2003 | Hugh | 2004/0255048 A1 | 12/2004 | Lev Ran et al. |
| 2003/0233419 A1 | 12/2003 | Beringer | 2004/0257169 A1 | 12/2004 | Nelson |
| 2004/0001106 A1 | 1/2004 | Deutscher et al. | 2005/0004928 A1 | 1/2005 | Hamer et al. |
| 2004/0002993 A1 | 1/2004 | Toussaint et al. | 2005/0010860 A1 | 1/2005 | Weiss et al. |
| 2004/0003247 A1 | 1/2004 | Fraser et al. | 2005/0015405 A1 | 1/2005 | Plastina et al. |
| 2004/0004638 A1 | 1/2004 | Babaria | 2005/0027757 A1 | 2/2005 | Kiessig et al. |
| 2004/0006549 A1 | 1/2004 | Mullins et al. | 2005/0050470 A1 | 3/2005 | Hudson et al. |
| 2004/0008226 A1 | 1/2004 | Manolis et al. | 2005/0055306 A1 | 3/2005 | Miller et al. |
| 2004/0019584 A1 | 1/2004 | Greening et al. | 2005/0071355 A1 | 3/2005 | Cameron et al. |
| 2004/0019655 A1 | 1/2004 | Uemura et al. | 2005/0080807 A1 | 4/2005 | Beilinson et al. |
| 2004/0019875 A1 | 1/2004 | Welch | 2005/0097477 A1 | 5/2005 | Camara et al. |
| 2004/0030731 A1 | 2/2004 | Iftode et al. | 2005/0114672 A1 | 5/2005 | Duncan et al. |
| 2004/0044696 A1 | 3/2004 | Frost | 2005/0120242 A1 | 6/2005 | Mayer et al. |
| 2004/0044776 A1 | 3/2004 | Larkin | 2005/0131903 A1 | 6/2005 | Margolus et al. |
| 2004/0054674 A1 | 3/2004 | Carpenter et al. | 2005/0131905 A1 | 6/2005 | Margolus et al. |
| 2004/0056894 A1 | 3/2004 | Zaika et al. | 2005/0138567 A1 | 6/2005 | Smith et al. |
| 2004/0056896 A1 | 3/2004 | Doblmayr et al. | 2005/0149481 A1 | 7/2005 | Hesselink et al. |

| | | | |
|---|---|---|---|
| 2005/0165753 A1 | 7/2005 | Chen et al. | |
| 2005/0166159 A1 | 7/2005 | Mondry et al. | |
| 2005/0171947 A1 | 8/2005 | Gautestad | |
| 2005/0192953 A1 | 9/2005 | Neale et al. | |
| 2005/0192966 A1 | 9/2005 | Hilbert et al. | |
| 2005/0243993 A1 | 11/2005 | McKinzie et al. | |
| 2005/0246331 A1 | 11/2005 | De Vorchik et al. | |
| 2005/0246643 A1 | 11/2005 | Gusmorino et al. | |
| 2005/0246664 A1 | 11/2005 | Michelman et al. | |
| 2005/0256909 A1 | 11/2005 | Aboulhosn et al. | |
| 2005/0257169 A1 | 11/2005 | Tu | |
| 2005/0283476 A1 | 12/2005 | Kaasten et al. | |
| 2006/0004692 A1 | 1/2006 | Kaasten et al. | |
| 2006/0020586 A1 | 1/2006 | Prompt et al. | |
| 2006/0036568 A1 | 2/2006 | Moore et al. | |
| 2006/0053066 A1 | 3/2006 | Sherr et al. | |
| 2006/0053388 A1 | 3/2006 | Michelman | |
| 2006/0059204 A1 | 3/2006 | Borthakur et al. | |
| 2006/0080308 A1 | 4/2006 | Carpentier et al. | |
| 2006/0090137 A1 | 4/2006 | Cheng | |
| 2006/0129627 A1 | 6/2006 | Phillips et al. | |
| 2006/0173873 A1 | 8/2006 | Prompt et al. | |
| 2006/0200455 A1 | 9/2006 | Wilson | |
| 2006/0200466 A1 | 9/2006 | Kaasten et al. | |
| 2006/0200832 A1 | 9/2006 | Dutton | |
| 2006/0218122 A1 | 9/2006 | Poston et al. | |
| 2006/0277432 A1 | 12/2006 | Patel et al. | |
| 2007/0168885 A1 | 7/2007 | Muller et al. | |
| 2007/0180432 A1 | 8/2007 | Gassner et al. | |
| 2007/0186183 A1 | 8/2007 | Hudson | |

FOREIGN PATENT DOCUMENTS

| | | |
|---|---|---|
| GB | 2329492 | 3/1999 |
| JP | 09244940 | 9/1997 |
| JP | 2001067250 | 3/2001 |
| JP | 2001142766 | 5/2001 |
| JP | 2001154831 | 6/2001 |
| JP | 2001188702 | 7/2001 |
| JP | 2002182953 | 6/2002 |
| JP | 2002334103 | 11/2002 |
| JP | 2002269145 | 4/2004 |
| JP | 2002099565 | 4/2005 |
| WO | WO9322738 | 11/1993 |
| WO | WO9412944 | 6/1994 |
| WO | WO9414281 | 6/1994 |
| WO | 9938092 | 7/1999 |
| WO | WO9949663 | 9/1999 |
| WO | WO0051021 | 8/2000 |
| WO | 01/63919 A1 | 8/2001 |
| WO | WO0157867 | 8/2001 |
| WO | WO0167668 | 9/2001 |
| WO | WO 0225420 | 3/2002 |
| WO | WO03001720 | 1/2003 |
| WO | WO 2004107151 | 9/2004 |
| WO | 2004097680 A1 | 11/2004 |

OTHER PUBLICATIONS

Ray, Jay, Mac OS X Unleashed, Nov. 2001, Sams, Chapter 4. The Finder: Working with Files and Applications (pp. 1-15), Getting File Information (pp. 1-7).
Cohen, et al., "A Case for Associative Peer to Peer Overlays"—ACM SIGCOMM Computer Communications Review, vol. 33, No. 1, Jan. 2003, pp. 95-100.
Lui, et al., "Interoperability of Peer-to-Peer File Sharing Protocols"—ACM SIGecom Exchanges, vol. 3, No. 3, Aug. 2002, pp. 25-33.
International Search Report and Written Opinion of PCT/US04/25931 dated Apr. 3, 2007.
Kuchinsky, et al., "FotoFile: A Consumer Multimedia Organization and Retrieval System", May 1999, ACM, pp. 496-503.
Written Opinion of SG 200301764-7 dated Jan. 11, 2007.
Windows Commander (website), <URL: http://www.ghisler.com>, accessed using http://www.archive.org/web/web.php, in particular, http://web.archive.org/web/20030207145141/www.ghisler.com/featurel.htm, archived on Feb. 7, 2003; http://web.archive.org/web/20021017022627/www.ghisler.com/addons.htm, archived on Oct. 17, 2002; http://web.archive.org/web/20021009213316/www.ghisler.com/efaquser.htm, archived on Oct. 9, 2003; unable to access website.
Bott, et al., "Microsoft Windows XP Inside Out", Microsoft Press, 2001, Chapter 11, 39 pages.
Wikipedia, File Allocation Table, 2006, <http://en.wikipedia.org/wiki/File_Allocation_Table>.
Bott, et al., Book titled "Special Edition Using Windows 98, Second Edition", Dec. 21, 1999, second edition, pp. 1-7.
Supplementary European Search Report for EP 04780390 dated Jun. 18, 2007.
Lee, J., "An End-User Perspective on File-Sharing Systems," Communications of the ACM 46(2):49-53, Feb. 2003.
Ohtani, A., et al., "A File Sharing Method For Storing Area Network and Its Performance Verification," NEC Res. & Develop. 44(1):85-90, Jan. 2003.
H. Weinreich, et al., "The Look of the Link—Concepts of the User Interface of Extended Hyperlinks," Proceedings of the Twelfth ACM Conference on Hypertext and Hypermedia, Hypertext '01, Aarhus, Denmark, Aug. 2001, pp. 19-28.
Seltzer, M., et al., "Journaling Versus Soft Updates: Asynchronous Meta-data Protection in File Systems," Proceedings of the 2000 USENIX Technical Conference, San Diego, CA, Jun. 18-23, 2000, pp. 71-84.
R. Rao, et al., "Rich Interaction in the Digital Library," Communications of the ACM 38(4):29-39.1995.
Piernas, J., et al., "DualFS: A New Journaling File System Without Meta-Data Duplication," Conference Proceedings of the 2002 International Conference on SuperComputing, New York, Jun. 22-26, 2002, pp. 137-146.
Manber, U., and S. Wu, "Glimpse: A Tool to Search Through Entire File Systems," Proceedings of USENIX Winter 1994 Conference, San Francisco, Ca, Jan. 17-21, 1994.
Coster, R., and D. Svensson, "Inverted File Search Algorithms for Collaborative Filtering," Proceedings of the 25th Annual International ACM SIGIR Conference on Research and Development in Information Retrieval, Tampere, Finland, Aug. 11-15, 2002.
Gifford, D.K., et al., "Semantic File Systems," Proceedings of the 13th ACM Symposium on Operating Systems Principles, Pacific Grove CA., Sep. 1991, pp. 16-25.
Blair, C., and G.E. Monahan, "Optimal Sequential File Search: A Reduced-State Dynamic Programming Approach," European Journal of Operational Research 86(2):358-365, 1995.
Clay, L.M., et al., Posting Protocol for Improved Keyword Search Success in Peer-to-Peer File Sharing Systems, Proceedings of SPIE—Int. Soc. Opt. Eng., Santa Clara, CA, Jan. 23-24, 2003, vol. 5019, pp. 138-149.
Na, J., and V. Rajaravivarma, "Multimedia File Sharing in Multimedia Home or Office Business Networks," Proceedings of the 35th Southeastern Symposium on System Theory, Morgantown, W. Va., Mar. 16-18, 2003, pp. 237-241.
Kwon G., and K.D. Ryu, "An Efficient Peer-to-Peer File Sharing Exploiting Hierarchy and Asymmetry," Proceedings of the 2003 Symposium on Applications and the Internet, Orlando, Fla., Jan. 27-31, 2003, pp. 226-233.
Qian, J., et al., "ACLA: A Framework for Access Control List (ACL) Analysis and Optimization," Fifth Joint Working Conference on Communications and Multimedia Security, Darnstadt, Germany, May 21-22, 2001, pp. 197-211.
Rao, J.R., "Some Performance Measures of File Sharing on Multiple Computer Systems," Proceedings of the Conference on Modeling and Simulation, vol. 6, Part I, Pittsburgh, Penn., Apr. 24-25, 1976, pp. 527-530.
Reinauer, R., "UNIX System V.# Remote File Sharing Capabilities and Administration," Unisphere 8(6):64-68, Sep. 1988.
Templin, P.J., Jr., "Providing a Centralized File Sharing Resource at Bucknell University", Proceedings of the User Services Conference for College and University Computing Services Organization, Bloomington, Ind., Oct. 25-28, 1998, pp. 289-292.

Yamai, N. et al., "NFS-Based Secure File Sharing Over Multiple Administrative Domains With Minimal Administration," Systems and Computers in Japan 33(14):50-58, Dec. 2002.

Yong Kyu Lee, et al., Metadata Management of the SANtopia File System, Proceedomgs of the 8th International Conference onParallel and Distributed Systems (ICPADS 2001), Kyoungju City, Korea, Jun. 26-29, 2001, pp. 492-499, IEEE Computer Society, 2001, ISBN 0-7695-1153-8.

Horst F. Wedde, et al., A Universal Framework for Managing Metadata in the Distributed Dragon Slayer System, Proceedings of the 26th EUROMICRO Conference (EUROMICRO'00), vol. 2, Maastricht, The Netherlands, Sep. 5-7, 2000, pp. 96-101, IEEE Computer Society, 2000, ISBN 1089-6503.

Jolon Faichney, et al., Goldleaf Hierarchical Document Browser, Second Australian User Interface Conference (AUIC'01), Gold Coast, Queensland, Australia, Jan. 29-Feb. 1, 2001, pp. 13-20, IEEE Computer Society, 2001, ISBN 0-7695-0969-X.

Dino Esposito, New Graphical Interface: Enhance Your Programs with New Windows XP Shell Features, MSDN Magazine, Nov. 2001, vol. 16, No. 11.

Stuart Yeates, et al., Tag Insertion Complexity, Data Compression Conference, (DCC 2001), Snowbird, Utah, USA, Mar. 27-29, 2001,pp. 243-252, IEEE Computer Society2001, ISBN 1068-0314.

Bipin C. Desal, et al., Resource Discovery: Modeling, Cataloguing and Searching, Seventh International Workshop on Database and Expert Systems Applications (DEXA '96), Zurich, Switzerland, Sep. 9-10, 1996, pp. 70-75, IEEE-CS Press, 1996, ISBN 0-8186-7662-0.

Gulrukh Ahanger, et al., Automatic Composition Techniques for Video Production, IEEE Transactions on Knowledge and Data Engineering, Nov./Dec. 1998, pp. 967-987, vol. 10, No. 6, IEEE Computer Society, 1998, ISBN 1041-4347.

Jane Hunter, An Overview of the MPEG-7 Description Language (DDL), IEEE Transactions on Circuits and Systems for Video Technology, Jun. 2001, pp. 765-772, vol. 11, No. 6, IEEE Computer Society, 2001, ISBN 1051-8215.

Philippe Salembier, et al., MPEG-7 Multimedia Description Schemes, IEEE Transactions on Circuits and Systems for Video Technology, Jun. 2001, pp. 748-759, vol. 11, No. 6, IEEE Computer Society, 2001, ISBN 1051-8215.

Thomas Sikora, The MPEG-7 Visual Standard for Content Description—An Overview, IEEE Transactions on Circuits and Systems for Video Technology, Jun. 2001, pp. 696-702, vol. 11, No. 6, IEEE Computer Society, 2001, ISBN 1051-8215.

B.S. Manjunath, Et al., Color and Texture Descriptors, IEEE Transactions on Circuits and Systems for Video Technology, Jun. 2001, pp. 703-715, vol. 11, No. 6, IEEE Computer Society, 2001, ISBN 1051-8215.

"Predefined Properties" http://help.sap.comlsaphelp—ep50sp5/helpdata/en/la/9a4a3b80f2ec40aa74556bc87a94259/content.htm.

"Info Vision Infonnation Management System" http://66.1 02. 7.1 04/search?q=cache:m IXV6K6sQOQJ:www.amlib.netlproducts/infovision.htm+customised+multi+property+file+navigation &hl=en.

"Previewing Files in the Common Dialog" http://www .elitevb.comlcontentiO 1,0084,0 II.

"TdcFolderListView component" http://www.appcontrols.comlmanualsldiskcontrols/index.html?tdcfolderlistview.htm.

"Previewing Files" http://developer.apple.comldocumentation/QuickTimeIINMAC/QT/iqMovieToolbox.1a.htm.

"Text File Previewer 2.0 Beta" http://www .freedownloadscenter.comIUtilitiesIText- ViewersIText- File]reviewer.html.

"Your Next OS: Windows 2006?" http://www.pcworld.comInewsiarticle/O,aid,II3'631,OO.asp.

"GetOpenFileName Function," downloaded from <http://msdn.microsoft.com>; date of first publication prior to Mar. 28, 2005; 2 pages.

"GetSaveFileName Function," downloaded from <http://msdn.microsoft.com>; date of first publication prior to Mar. 28, 2005; 2 pages.

"Using Common Dialog Boxes," downloaded from <http://msdn.microsoft.com>; date of first publication prior to Mar. 28, 2005; 8 pages.

"How to Use a Common Dialog File Open Dialog with Win32 API," downloaded from <http://support.microsoft.com>; date of first publication prior to Mar. 28, 2005; 3 pp.

"Creating an Enhanced Metafile," downloaded from <http://msdn.microsoft.com>; date of first publication prior to Mar. 28, 2005; 2 pages.

"Common Dialog Box Library," downloaded from <http://msdn.microsoft.com>: date of first publication prior to Mar. 28, 2005; 8 pages.

"OpenFileName Structure," downloaded from <http://msdn.microsoft.com>; date of first publication prior to Mar. 28, 2005; 7 pages.

"Open and Save as Dialog Boxes," downloaded from <http://msdn.microsoft.com>; date of first publication prior to Mar. 29, 2005; 9 pages.

"Customizing common dialog boxes," downloaded from http://msdn.microsoft.com; date for first publication prior to Apr. 20, 2005, 4 pages.

G.D. Venolia, et al., Supporting Email Workflow. Microsoft Research Technical Report MSR-TR-2001-88. Revised Dec. 2001 (Original Sep. 2001). Microsoft Corporation, Redmond, WA.

G.D. Venolia and C. Neustaedter. Understanding Sequence and Reply Relationships within Email Converstations: A Mixed-Model Visualization. Microsoft Research Technical Report MSR-TR-2002-102. Sep. 23, 2002 (Revised Jan. 13, 2003).

Microsoft Digital Image Suite User's Manual, Version 9.0. pp. 105-118, Available: http://www.microsoft.com/products/imaging/guides/SuiteManual.pdf, Apr. 30, 2004.

"Using Tags to Organize Your Photos.", Adobe Photoshop Album 2.0 Tutorial, Available: http://www.adobe.com/digitalimag/tips/phsaltaggin/pdfs/phsaltaggin.pdf, Apr. 30, 2004.

Examples of dialogs user interfaces; date of first publication prior to Mar. 31, 2005; 8 pages.

"Visually Theming and Styling Your Applications and Documents" (CLI 308); downloaded from <http://msdn.microsoft.com/longhorn/pdcmaterials/pdctalksavalon/>; date of first publication prior to Mar. 31, 2005; 34 pages.

New User Interface Possibilities in Longhorn (CLI 304); downloaded from <http://msdn.microsoft.com/longhorn/pdcmaterials/pdctalksavalon/>; date of first publication prior to Mar. 31, 2005; 45 pages.

Windows Forms: Exploiting Windows Longhorn "Features from Within Your Application" (CLI 391); downloaded from http://msdn.microsoft.com/longhorn/pdcmaterials/pdctalksavalon/>; date of first publication prior to Mar. 31, 2005; 27 pages.

MessageBox Function; downloaded from <http://msdn.microsoft.com>; date of first publication prior to Mar. 31, 2005; 4 pages.

Creating and Installing Theme Files; downloaded from <http://msdn.microsoft.com>; date of first publication prior to Feb. 21, 2005; 4 pages.

"MessageBox Function"; downloaded from <http://msdn.microsoft.com>; date of first publication prior to Mar. 31, 2005; 4 pages.

"Creating and Installing Theme Files"; downloaded from <http://msdn.microsoft.com>; date of first publication prior to Feb. 21, 2005; 4 pages.

"About Dialog Boxes"; downloaded from <http://msdn.microsoft.com>; date of first publication prior to Feb. 21, 2005; 10 pages.

"Property Sheets and Inspectors"; downloaded from <http://msdn.microsoft.com>; date of first publication prior to Feb. 21, 2005; 6 pages.

"PropSheetPage"; downloaded from <http://msdn.microsoft.com>; date of first publication prior to Feb. 21, 2005; 3 pages.

"DialogProc Function"; downloaded from <http://msdn.microsoft.com>; date of first publication prior to Feb. 21, 2005; 2 pages.

"Creating Wizards"; downloaded from <http://msdn.microsoft.com>; date of first publication prior to Mar. 31, 2005; 17 pages.

"Property Sheets"; downloaded from <http://msdn.microsoft.com>; date of first publication prior to Mar. 31, 2005; 7 pages.

"Property Sheet Reference"; downloaded from <http://msdn.microsoft.com>; date of first publication prior to Mar. 31, 2005; 5 pages.
"DrawItemStruct Structure"; downloaded from <http://msdn.microsoft.com>; date of first publication prior to Feb. 25, 2005; 3 pages.
"Using Buttons"; downloaded from <http://msdn.microsoft.com>; date of first publication prior to Feb. 25, 2005; 5 pages.
Button Messages; downloaded from <http://msdn.microsoft.com>; date of first publication prior to Feb. 25, 2005; 4 pages.
"Button Styles"; downloaded from <http://msdn.microsoft.com>; date of first publication prior to Feb. 25, 2005; 2 pages.
"CreateWindow Function"; downloaded from <http://msdn.microsoft.com>; date of first publication prior to Feb. 25, 2005; 5 pages.
"Using Dialog Boxes"; downloaded from <http://msdn.microsoft.com>; date of first publication prior to Mar. 31, 2005; 8 pages.
"CreatePropertySheetPage Function"; downloaded from <http://msdn.microsoft.com>; date of first publication prior to Mar. 31, 2005; 1 page.
"DestroyPropertySheetPage Function"; downloaded from <http://msdn.microsoft.com>; date of first publication prior to Mar. 31, 2005; 1 page.
"PropertySheet Function"; downloaded from <http://msdn.microsoft.com>; date of first publication prior to Mar. 31, 2005; 2 pages.
"PropSheetPageProc Function"; downloaded from <http://msdn.microsoft.com>; date of first publication prior to Mar. 31, 2005; 2 pages.
"PropSheetProc Function"; downloaded from <http://msdn.microsoft.com>; date of first publication prior to Mar. 31, 2005; 2 pages.
"PSN_KillActive Notification"; downloaded from <http://msdn.microsoft.com>; date of first publication prior to Mar. 31, 2005; 1 page.
"PSN_QueryCancel Notification"; downloaded from <http://msdn.microsoft.com>; date of first publication prior to Mar. 31, 2005; 1 page.
"PSN_Reset Notification"; downloaded from <http://msdn.microsoft.com>; date of first publication prior to Mar. 31, 2005; 1 page.
"PSN_SetActive Notification"; downloaded from <http://msdn.microsoft.com>; date of first publication prior to Mar. 31, 2005; 1 page.
"PSN_TranslateAccelerator Notification"; downloaded from <http://msdn.microsoft.com>; date of first publication prior to Mar. 31, 2005; 1 page.
"PSN_WizBack Notification"; downloaded from <http://msdn.microsoft.com>; date of first publication prior to Mar. 31, 2005; 3 pages.
"PSN_WizFinish Notification" ; downloaded from <http://msdn.microsoft.com>; date of first publication prior to Mar. 31, 2005; 1 page.
"PSN_WizNext Notification"; downloaded from <http://msdn.microsoft.com>; date of first publication prior to Mar. 31, 2005; 3 pages.
"PSM_AddPage Message"; downloaded from <http://msdn.microsoft.com>; date of first publication prior to Mar. 31, 2005; 2 pages.
"PSM_IDToIndex Message"; downloaded from <http://msdn.microsoft.com>; date of first publication prior to Mar. 31, 2005; 1 page.
"PSM_IndexToHwnd Message"; downloaded from <http://msdn.microsoft.com>; date of first publication prior to Mar. 31, 2005; 1 page.
"PSM_IndexToID Message"; downloaded from <http://msdn.microsoft.com>; date of first publication prior to Mar. 31, 2005; 1 page.
"PSM_IndexToPage Message"; downloaded from <http://msdn.microsoft.com>; date of first publication prior to Mar. 31, 2005; 1 page.
"PSM_PageToIndex Message"; downloaded from <http://msdn.microsoft.com>; date of first publication prior to Mar. 31, 2005; 1 page.
"PSM_PressButton Message"; downloaded from <http://msdn.microsoft.com>; date of first publication prior to Mar. 31, 2005; 1 page.
"PSM_QuerySiblings Message" ; downloaded from <http://msdn.microsoft.com>; date of first publication prior to Mar. 31, 2005; 1 page.
"PSM_SetCurSel Message"; downloaded from <http://msdn.microsoft.com>; date of first publication prior to Mar. 31, 2005; 1 page.
"PSM_SetCurSelID Message"; downloaded from <http://msdn.microsoft.com>; date of first publication prior to Mar. 31, 2005; 1 page.
"PSM_SetFinishText Message"; downloaded from <http://msdn.microsoft.com>; date of first publication prior to Mar. 31, 2005; 1 page.
"PSM_SetHeaderTitle Message"; downloaded from <http://msdn.microsoft.com>; date of first publication prior to Mar. 31, 2005; 1 page.
"PSM_SetWizButtons Message"; downloaded from <http://msdn.microsoft.com>; date of first publication prior to Mar. 31, 2005; 2 pages.
"PropSheetHeader Structure" ; downloaded from <http://msdn.microsoft.com>; date of first publication prior to Mar. 31, 2005; 5 pages.
"PropSheetPage Structure"; downloaded from <http://msdn.microsoft.com>; date of first publication prior to Mar. 31, 2005; 4 pages.
"PshNotify Structure"; downloaded from <http://msdn.microsoft.com>; date of first publication prior to Mar. 31, 2005; 1 page.
"BCM_GetIdealSize Message"; downloaded from <http://msdn.microsoft.com>; date of first publication prior to Mar. 31, 2005; 1 page.
"PSM_SetTitle Message"; downloaded from <http://msdn.microsoft.com>; date of first publication prior to Mar. 31, 2005; 1 page.
European Search Report for 03007909.9-2211 dated Jun. 30, 2006.
D. Esposito, "More Windows 2000 UI Goodies: Extending Explorer Views by Customizing Hypertext Template Files", MSDN Magazine, <http://msdn.microsoft.com/msdnmag/issues/0600/w2kui2/default.aspx?print=true?, first date of publication unknown but no later than Jun. 2000, 15 pages.
Microsoft: "Microsoft Windows 2000 Professional Step By Step—Lesson 3—Managing Files and Folders" <http://www.microsoft.com/mspress/books/sampshap/1589.asp>, Jan. 5, 2000, 12 pages.
Australian Search Report for SG 200301764-7 dated Mar. 30, 2006.
D. Esposito, Visual C++ Windows Shell Programming, Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997, 20 pages.
Australian Written Opinion for SG 200301764-7 dated Mar. 30, 2006.
Windows Commander, <http://web.archive.org/web/20030207145141/www.ghisler.com/featurel.htm> (Feb. 7, 2003) and <http://web.archive.org/web/20021017022627/www.ghisler.com/addons.htm> (Oct. 17, 2002), 7 pages.
Directory Opus 6.1—Viewer SDK Plugin SDK 1.0, GP Software, 2001, <http://web.archive.org/web/20030219151121/www.gpsoft.com.au/Developer.html>, first date of publication unknown but, prior to Feb. 19, 2003, 30 pages.
Microsoft Press Pass, "Windows XP is Here!", New York, Oct. 25, 2001.
Microsoft, "Microsoft Windows XP Professional Product Documentation" section: (1) To Change how you view items in a folder, (2) Viewing files and folders overview, (3) To associate a file with a program, (4) To Change or remove a program, copyright 2006, publication date unknown.
McFedries, Paul, "The Complete Idiot's Guide to Windows XP", Table of Contents, Oct. 3, 2001; Alpha Books, Chapter 8: A Tour of the My Pictures Folder—printed pp. 1-8, Chapter 11: Sights and Sounds: Music and Other Multimedia—printed pp. 1-3.
Stanek R. William, "Microsoft Windows XP Professional Administrator's Pocket Consultant", Sep. 25, 2001; Microsoft Press, Chapter 9, printed pp. 1-8.
Shah, Sarju, "Windows XP Preview", FiringSquad, May 4, 2001, online, printed pp. 1-5; Figure: Hi-Res Image Viewer.
McFedries, Paul; "The Complete Idiot's Guide to Windows XP", Table of Contents, Oct. 3, 2001; Alpha Books, Ch. 6: Using My Computer to Fiddle w/h Files and Folder-printed p. 1-6, Finding a File in Mess p. 103.
Russian Official Action and English Translation of Official Action for Application No. 2003114526/09 dated May 11, 2007, 7 pages.
Grosky, et al., "Using Metadata for Intelligent Browsing of Structured Media Objects", Dec. 1994, Sigmond Record, vol. 23, No. 4, pp. 49-56.
International Search Report for PCT/US06/26854 dated Sep. 25, 2007.
Examination Report for New Zealand Patent No. 534665 dated Jul. 27, 2007.
Microsoft Windows XP Version 2002 (Screen Dumps, Figs. 1-16).
Simpson, Alan, Windows 95 Uncut, 1995, IDG Books Worldwide, Inc., pp. 104-107.
Feng, et al., "Schemata Transformation of Object-Oriented Conceptual Models to XML", Computer systems Science & Engineering, vol. 18, No. 1, Jan. 2003.
Joseph, M., "The UML for Data Modellers," Elektron, Apr. 2004, pp. 72-73.
Wang, G., et al., "Extending XML Schema with Nonmonotonic Inheritance," in M.A. Jesufeld and O. Paster (eds.), ER 2003 Workshops, Lecture Notes in Computer Science 2814:402-407,2003.
Olivie, et al., "A Generic Metadata Query Tool", 1999, pp. 1-8.
Rathbone, Windows XP for Dummies, 2001, Wiley Publishing, Inc., pp. 145, 203 and 204.
Microsoft Windows XP Professional, 1985-2001.
Written Opinion of Singapore Application No. 200403220-7 dated May 18, 2006.
A.T. McCray, et al., Extending the Role of Metadata in a Digital Library System, May 19, 1999, IEEE, pp. 190-199.
Alexa T. McCray, et al., Principles for Digital Library Development, May 2001, ACM, pp. 49-53.
Stelovsky, J., and C. Aschwanden, "Software Architecture for Unified Management of Event Notification and Stream I/O and Its Use for Recording and Analysis of User Events," *Proceedings of the 35th Annual Hawaii International Conference on System Sciences*, IEEE Computer Society, Big Island, Hawaii, Jan. 7-10, 2002, p. 1862-1867.
"About Managing Messaged With Rules", Microsoft® Outlook® 2003 Help file, 3 pp.
"Trillian/Trillian Pro IM Clients" Products Description, © 1999-2004 Cerulean Studios, <http://www.ceruleanstudios.com> [retrieved Apr. 30, 2004].
International Search Report of WO2004/097638 A1 (McKee, et al.) dated Nov. 11, 2004.
Adobe, Inc., et al., "Adobe Photoshop CS Classroom in a Book," Dec. 1, 2003, pp. 1-29.
Adobe, Inc., et al., "Adobe Photoshop 7.0", 2001; pp. 1-9.
Heinlein, et al., "Integration of Message Passing and Shared Memory in the Stanford Flash Multiprocessor, Architectural Support for Programming Languages and Operating Systems," pp. 38-50, published 1994.
Louis, et al., "Context Learning Can Improve User Interaction Information Reuse and Integration," Proceedings of the 2004 IEEE International Conference on, pp. 115-120, Nov. 8-10, 2004.
European Search Report for 03007909.9-2211 dated Jun. 30, 2006.
D. Esposito, "More Windows 2000 UI Goodies: Extending Explorer Views by Customizing Hypertext Template Files", MSDN Magazine, <http://msdn.microsoft.cornimsdnmagiissues/0600/w2kui2/default.aspx?print=true?, first date of publication unknown but no later than Jun. 2000, 15 pages.
Microsoft: "Microsoft Windows 2000 Professional Step by Step -Lesson 3- Managing Files and Folders" <htlp://www.microsolt.com/mspress/books/sampshap/1589.asp>, Jan. 5, 2000, 12 pages.

Australian Search Report for SG 200301764-7 dated Mar. 30, 2006.
D. Esposito, Visual C++ Windows Shell Programming, Dec. 1, 1998, Apress, ISBN 1861001843, pp. 463-469.
P. DiLascia, "More Fun with MFC:DIBs, Palettes, Subclassing, and a Gamut of Goodies, Part III", Microsoft Systems Journal, Jun. 1997,20 pages.
Australian Written Opinion for SG 200301764-7 dated Mar. 30, 2006.
Windows Commander, http://web.archive.org/web/20030207145141/www.ghislercornifeaturel.htm> (Feb. 7, 2903) and <http://web.archive.org/web/20021017022627/www.ghislercom/addons.htm> (Oct. 17, 2002), 7 pages.
Directory Opus 6.1 - Viewer SDK Plugin Sdk 1.0, GP Software, 2001, <http://web.archive.org/web/200313219151121/ www.gpsoft.com.au/Developer.html>, first date of publication unknown but, prior to Feb. 19, 2003, 30 pages.
Andy Rathbone, Windows XP for Dummies, 2001, Wiley Publishing, Inc., pp. 145, 203, 204.
Microsoft Windows Xp Professional, 1985-2001.
Microsoft Windows Xp Version 2002 Screen Dumps.
Verhoeven et al., A Generic Metadata Query Tool, Oct. 1999.
Anonymous, "Organize Your Digital Media Collection,"Jun. 30, 2003, 3 pages, www.microsoft.com/windowsxp/using/windowsmediaplayer/getstarted/organize.mspx.
Australian Search Report for SG 200301757-1, Dec. 1, 2004.
Cohen, J. "The Unofficial Guide to the Workplace Shell," Apr. 5, 1992, 45 pages, http://www.verfasser.de/web/web.nsf/c5.
Cooper, A., "About Face the Essentials of User Interface Design," IDG Books, 1995, p. 141.
Campbell, David, "Extending the Windows Explorer with Name Space Extensions," Microsoft Systems Journal, Microsoft Corporation, vol. 5, No. 6, Jul. 1996, pp. 89 - 96.
Dorot, V., "Explanatory Dictionary on Modern Computer Vocabulary," S. Petersburg, BHV-Petersburg, pp. 218-219.
Bott, Ed et al., "Master Your Music Library," May 5, 2003, 7 pages, www.microsoft.com/windowsxp/using/ windowsmediaplayer/expert/bott_03may05.mspx.
English translation of Office Action for CN03801850.0 dated Aug. 10, 2007.
International Search Report of PCT/US05/26655.
Sugasawa, Eiji, "When and What of Pictures Become Clear! How to Readily Organize Images from Digital Cameras," Nikkei PC Beginners, vol. 2, No. 4, pp. 78-95, Nikkei Business Publications, Inc., Japan.
Sellen, Abigail J. et al., "How Knowledge Workers Use the Web," Proceedings of the Sigchi Conference on Human Factors in Computing Systems: Changing Our World, Changing Ourselves, ACM, 2002, pp. 227-234.
International Search Report and Written Opinion of PCT/US05126655, Mar. 21, 2006.
International Search Report for PCT Application Serial No. PCT/US05113589, Dec. 7, 2005, 5 pages.
International Search Report for EP 03007786, Aug. 6, 2004.
International Search Report of EP 0315717, Aug. 26, 2003.
International Search Report of EP 03007909, Jun. 13, 2006.
International Search Report of PCT/US03/15625, Aug. 8, 2003.
International Search Report of PCT/US05/13589, Apr. 22, 2005.
International Search Report of PCT/US05/27258, Aug. 1, 2005.
Jamsa, K., "1001 Windows 98 Tips," 1998, 2 pages, Jamsa Press.
Japanese Patent Office, Notice of Rejection, Japanese Patent No. 2004-571417, Feb. 17, 2009, 10 pages.
Sekiguchi, Kumiko, "Visual Basic Q&A," MSDN Magazine 2001, No. 16, Jul. 18, 2001, pp. 97-103, ASCII Inc., Japan.
Capretz, Luiz F. et al., "Component-Based Software Development," Nov. 2001, pp. 1834-1837, IECON '01, the 27th Annual Conference of the IEEE Industrial Electronics Society.
Russionovich, Mark, "Internal Structure of NTFS4.0," Aug. 1, 2001, pp. 176-182, Nikkei Windows 2000, vol. 2, No. 53, Nikkei Business Publications, Inc., Japan.
Halvorson, Michael, et al, "Microsoft Office XP, Professional Office Manual," Jul. 23, 2001, pp. 78-80, first edition, Nikkei BP Soft Press.
Microsoft Corporation, "Windows 98 Step by Step," 1998, p. 63, Microsoft Press.

Patent Abstracts of Japan, Publication No. 2002-099565, Information Retrieval Apparatus, Abstract, May 4, 2002, 1 page.

Patent Abstracts of Japan, Publication No. 2002-334103, Retrieval Processing System and Retrieval Processing Method, Abstract, Nov. 22, 2002, 1 page.

Dourish, Paul, et al., "Presto: An Experimental Architecture for Fluid Interactive Document Spaces," ACM Transactions on Computer - Human Interaction (TOCHI) Jun. 1999, pp. 133-161, vol, 6, Issue 2, ACM "Revelle, A Visual Search Tool for Early Elementary Science Students," Mar. 2002, pp. 49-57, vol. 11, Journal of Science Education and Technology.

Zhujun, Xu James, "Survey of Some Mobile Agent System," Feb. 10, 2003, pp. 1-22.

Northrup, Tony, et al., "Plus! Party Mode: Mix Audio and Video in Playlists," Mar. 17, 2003, 6 pages, www.microsoft.com/windowsxp/using/windowsmediaplayer/expert/northrup_03march17.mspx.

European Search Report dated Sep. 20, 2007 for European Patent Application No. 05 10 3492, 5 pages.

Ferri, Fernando, et al. "An Object-Oriented Model for a Multi-Media Patient Folder Management System," ACM Sibgio Newsletter, vol. 16, Issue 1, Jun. 1996, pp. 2-18.

Anciaux, et al., "A Tamper-Resistant and Portable Healthcare Folder," Hindawai Publishing Corporation, International Journal of Telemedicine and Applications, vol. 2008, Article ID 763534, pp. 1-9.

Miles, Darryl, "Implementing Windows Terminal Server and Citrix MetaFrame on IBM @ Server X Series Servers," Apr. 2003, pp. 1-62.

Microsoft Windows XP Professional, Screen Shots 1-8, copyright (1985-2001).

English translation of Official Notice of Rejection for JP2003125924 dated Nov. 21, 2008.

* cited by examiner

| Selected Object | Target Object | | | | | |
|---|---|---|---|---|---|---|
| | Folder (same volume) | Folder (different volume) | List (same volume) | List (different volume) | Persisted Auto-List (same scope) | Persisted Auto-List (different scope) |
| Item | Move | Copy | Add a shortcut to List | Add a shortcut to List | Set Properties | Copy + Set Properties |
| Multi-select Items | Move | Copy | Add a shortcut to List | Add a shortcut to List | Set Properties | Copy + Set Properties |
| Folder | Move | Copy | Add a shortcut to List | Add a shortcut to List | Set properties to the items in the Folder's item domain | Copy folder tree + Set Properties to the folder's item domain |
| List | Move | Copy List | Add a shortcut to List | Add a shortcut to List | Set Properties on the Items the List references | Copy List + Copy Items into Scope + Set Properties on the Items the List references |
| Persisted Auto-List | Move | Copy Auto-List | Add a shortcut to List | Add a shortcut to List | Set Properties on the Auto-List results | Copy Auto-List + Auto-List results + Set Properties, on the Auto-List results |
| Stack | Move | Copy | Add a shortcut to List | Add a shortcut to List | Set properties on the Stack contents | Copy Stack + Stack Contents + Set Properties, on the Stack contents |

Fig. 2

Labels Projects, Work

Copy to Desktop
Labels Urgent, Personal

Copy to Client Work Folder
Labels Music, James Taylor, Vocals, Guitar, Rock-n-Rc This Search Folder only accepts Type = Documents

RICH DRAG DROP USER INTERFACE

This application claims priority to, and is a continuation-in-part of, U.S. patent application Ser. No. 10/440,035, filed May 16, 2003, entitled "System and Method for Filtering and Organizing Items Based on Common Elements," which is a continuation-in-part of U.S. patent application Ser. No. 10/403,341, filed Mar. 27, 2003, and of the same title, and to which priority is also claimed herein; both of which are incorporated by reference herein as to their entireties.

BACKGROUND

Modern electronic file systems typically store files in a hierarchical tree structure. Each node of the tree is considered a folder that contains one or more files. Typically, in such electronic file systems the location of an item is limited by the organization defined the file system. For example, in many file systems each file is located in one (and only one) folder. This means that file lifetime and file organization are conflated. That is, a file can exist only while it has a location organized relative to other files or folders. In addition, a file cannot be placed in multiple organizations. This means that if a user wishes to view a file in multiple folders, for example, the user must make multiple copies of the file. This is both tedious and error-prone for the user, as well as wasteful of storage space.

In addition, when performing a drag/drop operation, it is not always clear to the user what action is going to be taken upon completion of the drag/drop operation. It can be even more confusing when multiple files for dragging/dropping have been selected together.

SUMMARY

There is a need for a more advanced electronic file system and user interface that more allows users to manipulate files and other objects in a more flexible way using a graphical user interface. With this flexibility comes an opportunity to provide richer information to the user as to what is happening while drag/drop operations are being performed.

Aspects of the present disclosure relate to various types of file system objects that may be implemented, including items, folders, lists, persisted auto-lists, and stacks. While folders, for example, contain actual objects, lists and persisted auto-lists contain references, or shortcuts, to objects, as opposed to the objects themselves. A persisted auto-list is automatically populated with references to objects having properties that conform to one or more criteria defined by the persisted auto-list.

Further aspects of the present disclosure are directed to providing preview information to the user during a drag operation of a selected object onto a target object in a graphical user interface. The preview information indicates what type(s) of action is to be taken if the selected object were to be dropped onto the target object, thereby providing the user with an opportunity to determine whether the particular drag/drop operation is desirable, before the drag/drop operation is completed. The particular action(s) to be taken may depend upon the type of the selected object and/or the type of the target object. For example, where the selected object is an item and the target object is a persisted auto-list, the action may include adding, removing, or modifying one or more properties of the selected object to conform to one or more criteria defined by the persisted auto-list.

Still further aspects of the present disclosure are directed to providing numerical feedback to the user when multiple objects are selected. For example, where seven objects are selected, the textual number "7" may appear next to the cursor. This may result in a much easier-to-understand user interface than in past interfaces where the multiple objects are scattered around the screen as they move. In conventional interfaces, it is sometimes difficult for a user to determine how many objects have been selected.

Still further aspects of the present invention are directed to performing various types of actions in response to different drag/drop combinations. The particular type of action performed may be determined by the type of the object being dropped and/or the type of the target object onto which the drop is to occur.

These and other aspects of the disclosure herein will be apparent upon consideration of the following detailed description of illustrative embodiments.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the claimed invention.

FIG. 2 is a table showing illustrative actions that may be taken in response to particular drag/drop operations.

DETAILED DESCRIPTION OF ILLUSTRATIVE EMBODIMENTS

Illustrative Computing Environment

Figure 1:
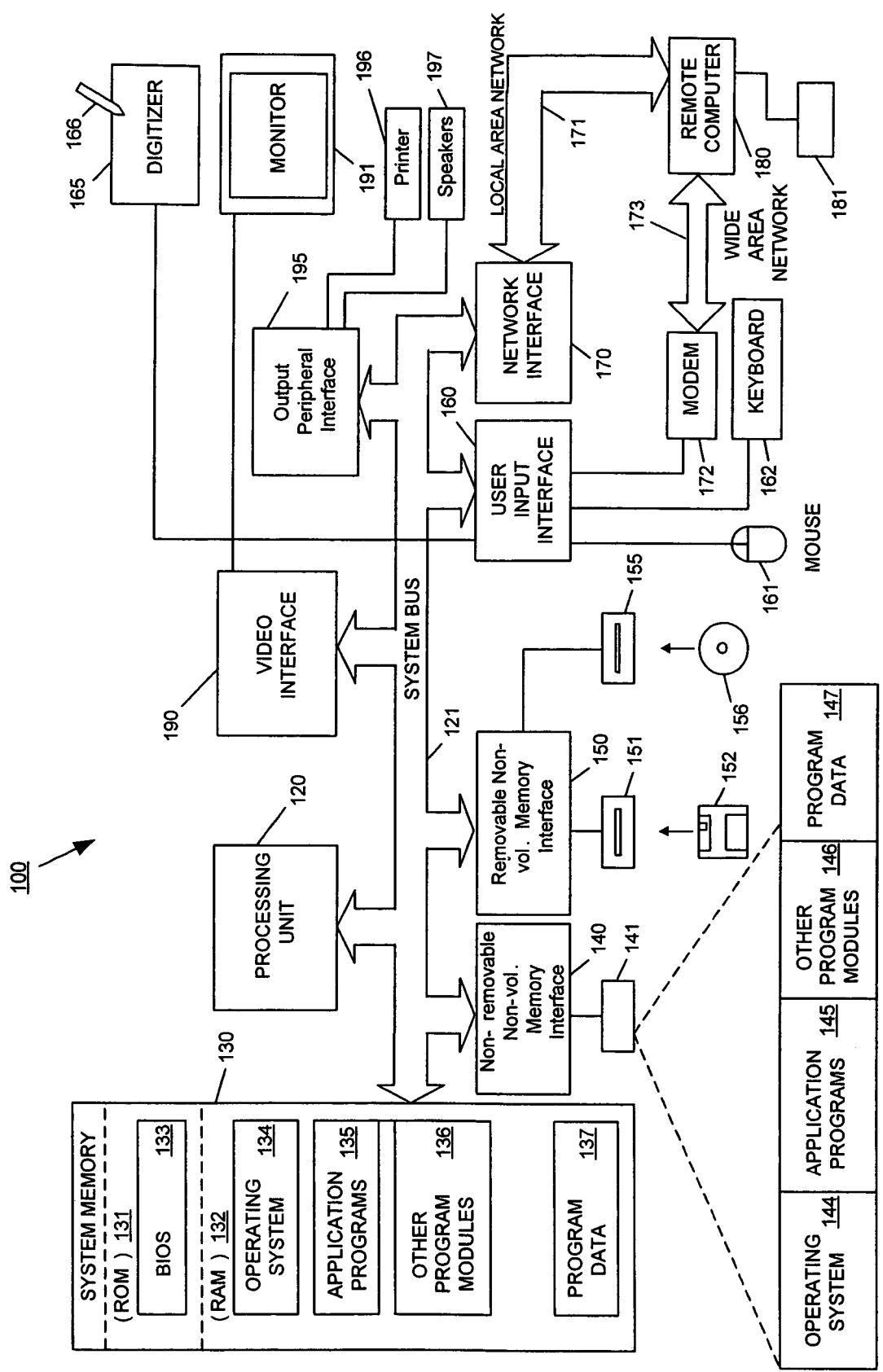
FIG. 1 is a functional block diagram of an illustrative computing environment.

FIG. 1 illustrates an example of a suitable computing environment 100 in which handwriting recognition functions and/or neural network creation, modification, and/or training may be implemented. Computing environment 100 is only one example of a suitable computing environment and is not intended to suggest any limitation as to the scope of use or functionality of the invention. Neither should computing environment 100 be interpreted as having any dependency or requirement relating to any one or combination of components illustrated in illustrative computing environment 100.

Other general purpose or special purpose computing system environments or configurations may be used. Examples of well known computing systems, environments, and/or configurations include, but are not limited to, personal computers (PCs); server computers; hand-held and other portable devices such as personal digital assistants (PDAs), tablet-style PCs or laptop PCs; multiprocessor systems; microprocessor-based systems; set top boxes; programmable consumer electronics; network PCs; minicomputers; mainframe computers; distributed computing environments that include any of the above systems or devices; and the like.

The disclosure herein is at times described in the general context of computer-executable instructions, such as program modules, being executed by a computer. Generally, program modules include routines, programs, objects, components, data structures, etc. that perform particular tasks or implement particular abstract data types. Distributed computing environments may further be used where tasks are performed by remote processing devices that are linked through a communications network. In a distributed computing environment, program modules may be located in both local and remote computer storage media including memory storage devices.

With reference to FIG. 1, illustrative computing environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer storage media and communication media. Computer storage media may include volatile, nonvolatile, removable, and non-removable media implemented in any method or technology for storage of information such as computer-readable instructions, data structures, program modules or other data. Computer storage media includes, but is not limited to, random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium that can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media.

System memory 130 includes computer storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162, a touch pad 165 (such as a digitizer) and stylus 166, and a pointing device 161 (commonly referred to as a mouse, trackball or touch pad). Touch pad 165 may be a separate physical device or may be integrated with a display device such as a monitor 191. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). Monitor 191 or other type of display device is also coupled to system bus 121 via an interface, such as a video interface 190. Video interface 190 may have advanced 2D or 3D graphics capabilities in addition to its own specialized processor and memory. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

File System Organization

An electronic file system may be implemented by computer 100 to manage files and other objects stored in the various electronic media to which computer 100 has access. The file system may be part of the other program modules 136 and/or part of operating system 134. The file system may be a traditional file system or a more advanced filing system that may be database-driven. In many traditional file systems, such as those based on a file allocation table (FAT) file system, traditional directory access to files assumes that users wish to maintain their files in a hierarchical directory tree. Files locations and the directory structure are dependent on one another; a user cannot move a file to another location without changing the directory structure.

On the other hand, a more advanced file system may be used that uses shortcut references, thus allowing files and other objects to appear in one or more location while actually being in another, different location. Such a file system may define various types of objects that provide a much more flexible way of managing files and other objects.

For example, one type of object is a list. For purposes of the present disclosure and claims, a list is an object that references a set of other objects in a particular order. The term "set" of objects as used in the present disclosure and claims is intended to include both a set of a plurality of objects and a set having only a single object. The objects referenced by the list may, for example, be an arbitrary set of objects each added to the list manually by the user. However, the objects referenced by a list are not actually stored in the list as they are in a conventional folder. Thus, more than one list may simultaneously reference the same object.

Another type of object that may be supported by the file system is a persisted auto-list. A persisted auto-list is similar to a list except that the set of objects referenced by a persisted auto-list are determined by a query. The query may define one or more criteria. Thus, for purposes of the present disclosure and claims, a persisted auto-list is defined as a list containing a set of objects that meet one or more criteria associated with the persisted auto-list. The content of a persisted auto-list is dynamic; the set of objects listed in a persisted auto-list may change in accordance a change in properties of various objects. For example, a persisted auto-list configured to contain references to all documents created by author John Doe (the query criteria in this case being type=documents and author="John Doe") may automatically update when John Doe creates a new file or deletes one of his files. The criteria associated with a persisted auto-list may include any criteria, such as object type, author, title, content, creation date, edit date, location in the file system (also referred to herein as "scope"), custom intrinsic properties, etc. Also, as discussed below, lists allow for extrinsic properties to be defined for objects referenced by those lists and persisted auto-lists.

Each object managed by the file system may include or otherwise be associated with one or more properties. These properties may be broadly categorized into two groups: extrinsic properties and intrinsic properties. The one or more criteria associated with a persisted auto-list form a query on the intrinsic properties of objects.

An extrinsic property is a property of an object that is stored separately from the object. In the context of a list, for example, the user may add a "List Notes" column that places comments only within the context of the list and not on the objects themselves that are referenced by the list. This may allow the user to make comments on objects that the user does not have the right to modify, for instance. Extrinsic properties would not travel with those objects outside of the context of that list. Thus, another list that references one or more of those same objects would not include the "List Notes" property of any of those items, unless of course the user added that property to the items in the context of the other list. Extrinsic properties may be manually added by the user or automatically added by the file system, operating system, and/or other program module.

An intrinsic property is a property that is stored with the item. For example, the title of a file may be considered to be an intrinsic property of the file where the title travels with the file. If the file were added to a particular folder or list, for instance, the file would still have its title. The content of an object is also an intrinsic property of the object. Also, the location of the object within the file system is another intrinsic property of the object.

Still another type of object that may be supported by the file system is a conventional folder. A folder is defined for purposes of the present disclosure and claims as an object that contains a set of other objects. A related type of object is a stack, which is a virtual container in a view representing the set of items that meet a given requirement. For instance, the user may stack a persisted auto-list or query results by "author" and then view all results by who wrote them. A stack would be presented for each author, where each stack may be of a different height based on the number of objects written by each author.

Still another type of object that may be supported by the file system is an item. An item may be, for example, a file, an email, a contact, or an appointment.

Objects referenced by lists and persisted auto-lists, as well as objects contained in folders and stacks, may be any types of objects in any combination. For example, a list, persisted auto-list, folder, or stack may each contain one or more files, emails, lists, persisted auto-lists, folder, stacks, and/or any other types of objects.

The file system may be organized into one or more volumes. A volume is defined for purposes of the present disclosure and claims as a physical storage medium or predetermined portion thereof represented by the file system as an individual storage resource.

Dragging/Dropping Objects

The operating system and/or file system may have a graphical user interface that presents an icon or other visual element that represents each object managed by the file system. The graphical user interface may further allow the user to drag and drop visual elements representing objects onto other visual elements representing other objects in a conventional manner. The terms "drag/drop" or "drag and drop" of a first object over or onto a second object, and variations thereof, will be used herein as shorthand language for the conventional dragging and dropping of a visual element representing the first object onto a visual element representing the second object. Many systems, such as Microsoft's WINDOWS line of operating systems, traditionally provide drag/drop functionality. Dragging and dropping can have different meanings in different contexts. For example, dragging a file onto a folder typically causes the file to be moved to into the folder. In other words, the location of the actual file object itself in the file system is changed. Also, dragging a document onto a printer object causes typically causes the document to be printed on the printer associated with the printer object. It should be noted that many such operating systems and file systems also provide for cut/copy/paste functionality. These are considered alternate user operations that obtain the same result. For example, dragging and dropping a file into a list may alternatively be accomplished by copying the file and pasting the file into the list.

However, drag/drop meanings need to be established between various combinations of objects and for contexts that have not previously been supported in traditional systems. For example, what does it mean to drop an item into an existing persisted auto-list? Examples of such drag/drop meanings are discussed herein, with reference to FIG. 2. FIG. 2 shows which action(s) is/are to be performed in response to a drag/drop input made by the user. Each row in FIG. 2 corresponds to a different type of object that is to be dropped (the "selected object"), and each column corresponds to a different type of object (the "target object") onto which the selected object is to be dropped.

Thus, FIG. 2 deals with six different possible types of selected objects: a single item, a group of multiple items, a folder, a list, a persisted auto-list, and a stack. FIG. 2 also deals with six different possible types of target objects: a folder within the same volume as the selected object, a folder in a different volume from the selected object, a list within the same volume as the selected object, a list in a different volume from the selected object, an auto-list defining a scope (i.e., location in the file system) that includes the selected object, and an auto-list defining a scope that does not include the selected object.

FIG. 2 will now be discussed on a column-by-column basis. Referring to the "Folder (same volume) column of FIG. 2, where the target object is a folder in the same volume as the selected object, then the action taken is to move the selected object to be within the target object, regardless of the type of selected object. This makes sense as it is most likely the user's intention when the selected object and the target object are within the same volume.

Similarly, referring to the "Folder (different volume)" column, where the target object is a folder in a different volume from the selected object, then the action taken is to copy the selected object and place the copy within the target object, regardless of the type of selected object. Again, it is most likely the user's intention in this case that a copy of the selected object be placed in the target object, and not the original selected object itself, where the target object is in a different volume. There is an exception where the selected object is a stack, however. In this case, dragging/dropping a selected stack to a target folder results in a persisted autolist being created that represents the selected stack in the target folder.

Referring to the "List (same volume)" and "List (different volume)" columns of FIG. 2, where the target object is a list, a drag/drop operation would cause a reference, or shortcut, to the selected object is placed in the list. This is true regardless of whether the target list is within the same volume as the selected object. There is an exception where the selected object is a stack, however. In this case, dragging a selected stack to a target list from a persisted auto-list results in a shortcut to the definition of the persisted autolist being created, which is embedded within the target list (not persisted as a separate file). Again, these are most likely the user's intentions when the user performs such drag/drop operation.

Referring to the "Auto-List (same scope)" column of FIG. 2, dragging any selected item(s) onto a persisted auto-list defining a scope that includes the selected object causes one or more properties of the selected object to be modified, removed, or added so that the selected object falls within the criterion or criteria defined by the target persisted auto-list. For example, assume that the target persisted auto-list defines criteria that objects referenced by the persisted auto-list must be (type=document) and (author="John Doe"), with a scope of folder c:\work\clientxyz. In this case, the persisted auto-list would automatically list all objects within its scope that meet those criteria. Assume, for example, that a document is within the defined scope but either has no author assigned or has a different author property assigned to it. The operation of dragging and dropping the document onto the target persisted auto-list would cause properties of the document to be set, if possible, so as to meet the criteria required by the persisted auto-list. In this example, the author property of the document would be changed to "John Doe" so that the document may properly be listed by the persisted auto-list.

It,is possible in certain situations that computer 100 determines that it is not possible to change the properties so as to meet all the criteria. For instance, if the object being dropped onto that same target persisted auto-list were not a document, then it would not make sense to change the type property of that object to be a document (since it is not in fact a document). In that case, the drag/drop operation may be disallowed.

Where the selected object to be dragged/dropped onto the target persisted auto-list in the same scope as the selected object is a folder, then the properties that are changed to meet the persisted auto-list criteria causes the items in the folder (but not the folder itself) to be referenced by the persisted auto-list. Likewise, the properties of the items in the selected folder are changed where possible to meet the criteria of the target persisted auto-list.

Where the selected object is a persisted auto-list, then dragging/dropping it onto another target persisted auto-list will set properties on the persisted auto-list results. In other words, properties of all of the items that conformed to the selected auto-list are changed, removed, or added such that they also conform to the target auto-list.

Where the selected object is a stack, then dragging/dropping it onto a target persisted auto-list will set the properties, where possible, of the contents of the stack to meet the criteria of the target persisted auto-list.

Referring to the "Auto-List (different scope)" column of FIG. 2, this column refers to the same situations as the previous column, except that now the selected object is outside the scope of the target persisted auto-list. In these cases, the selected object (or the objects referenced by the selected object, such as the objects listed in a selected list) is first copied, and the copy is placed within the scope of the target persisted auto-list. Then, the same actions referred to in the "Auto-List (same scope)" column are performed, except that the actions are performed on the copy instead of the original selected object.

Drag/Drop Modifiers

The actions resulting from the various drag/drop operations discussed in the examples above with regard to FIG. 2 are default actions. The default actions attempt to predict what the user's intentions are in performing each drag/drop operation. However, the user may manually override the actions to be taken by providing additional input along with a drag/drop operation. For example, the user may press a key on keyboard 162 while the drag/drop operation is being performed. For example, pressing the Shift key may cause any copy actions to be move actions, and pressing the Ctrl key may cause any move actions to instead be copy actions.

As further examples, when dragging to a list, pressing the Shift key while dragging may force the selected object to be moved to the target list's thicket folder, which is the location where the target list places objects when it collects objects. Or, when dragging to a list while pressing the Ctrl key, this may force the selected object to be copied to the list's thicket folder. When dragging to a persisted auto-list, then pressing the Shift key while dragging may force the selected object to be moved to the target persisted auto-list's default folder, which is the location where objects are placed when they are copied into the target auto-list's scope. Or, when dragging to a persisted auto-list while pressing the Ctrl key, this may force the selected object to be copied to the target persisted auto-list's default folder.

Drag/Drop Preview

Because there are now a wide variety of possible actions that may be taken in response to a drag/drop operation, it may be easy for the user to become confused as to what a particular drag/drop operation may mean. This may be true even though the system may be configured to take the most likely intended actions. Accordingly, it may be desirable to present feedback to the user a preview of some or all of the actions that are about to happen as a result of a given drag/drop operation, and/or a current status of the drag/drop operation. Based on this feedback, the user may then decide whether to complete, abort, or modify the drag/drop operation as desired.

This preview feedback may be presented in any form desired. For instance, the feedback may be in the form of iconic, graphical, textual, and/or any other type of feedback, and may be presented in any fixed or non-fixed portion of the display. The feedback may be visual and/or audible. Moreover, the feedback may move with the cursor and/or may be presented proximate to the cursor.

Figure 3:
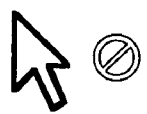
FIGS. 3-10 show illustrative preview feedback instances that may be presented in response to various drag/drop operations.

Examples of such preview feedback are shown in FIGS. 3-10. The shown feedback instances are merely illustrative. FIG. 3 shows an example of visual feedback that may occur during a pending drag/drop operation when the operation cannot be completed. This may occur, for example, responsive to the user having dragged an item over a persisted auto-list where the properties of the item cannot be modified to meet the criteria of the persisted auto-list.

Figure 4:
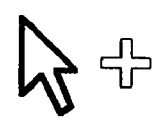

FIG. 4 shows an example of visual feedback that may occur during a pending drag/drop operation, indicating that the selected object will be copied in response to completion of the drag/drop operation. This may occur, for example, responsive to the user having dragged an item to a folder in a different volume.

Figure 5:

FIG. 5 shows an example of visual feedback that may occur during a pending drag/drop operation, indicating that multiple items have been selected. In this example, fourteen items have been selected. The number may dynamically change to indicate the actual number of items selected as each new item is added to the selection. In many conventional graphical user interface file systems, the selection of multiple files is indicated by the various icons of the files moving from their original displayed positions to new relative positions in accordance with the cursor. It can be difficult in that situation for the user to understand what is going on and how many files have been selected once their icons begin moving. In FIG. 5, however, the status of how many multiple selected items is easily viewed by the user. The icon to the left of the number in FIG. 5 may be a thumbnail of one of the selected items, such as the first item selected or the most recent item selected. Other information may also be provided such as the number of bytes selected.

Figure 6:

FIG. 6 shows an example of visual feedback that may occur during a pending drag/drop operation, indicating that the selected object will be added to a target list or target persisted auto-list in response to completion of the drag/drop operation.

Figure 7:
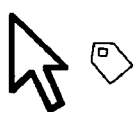

FIG. 7 shows an example of visual feedback that may occur during a pending drag/drop operation, indicating that a property of the selected object is to be added, removed, or modified, in response to completion of the drag/drop operation.

Figure 8:

FIG. 8 shows an example of visual feedback that may occur during a pending drag/drop operation, indicating that a persisted auto-list is to be created in response to completion of the drag/drop operation. A persisted auto-list may be created in response to a drag/drop operation when, for example, a user drags a particular stack from an existing set of query results and drops the stack somewhere. In this case, a new persisted auto-list may be automatically created, in response to the drag/drop operation, that persists out the definition of that query.

Figure 9:
Figure 10:

FIG. 9 shows an example of visual feedback that may occur during a pending drag/drop operation, indicating that the selected object is to be moved in response to completion of the drag/drop operation.

Where more than once action is to be taken, the various feedback instances, such as the icons in FIGS. 4-9, may be combined. For instance, FIG. 10 shows an example of visual feedback that may occur during a pending drag/drop operation, indicating that certain multiple actions are to be taken in response to completion of the drag/drop operation. In this example, responsive to completion of the pending drag/drop operation, three actions will be taken: the selected object will be copied, at least one of its properties will be added, removed, or modified, and a new persisted auto-list will be created. Although in this example the various icons are shown horizontally arranged, they may be arranged vertically or in any other manner.

Figure 11:
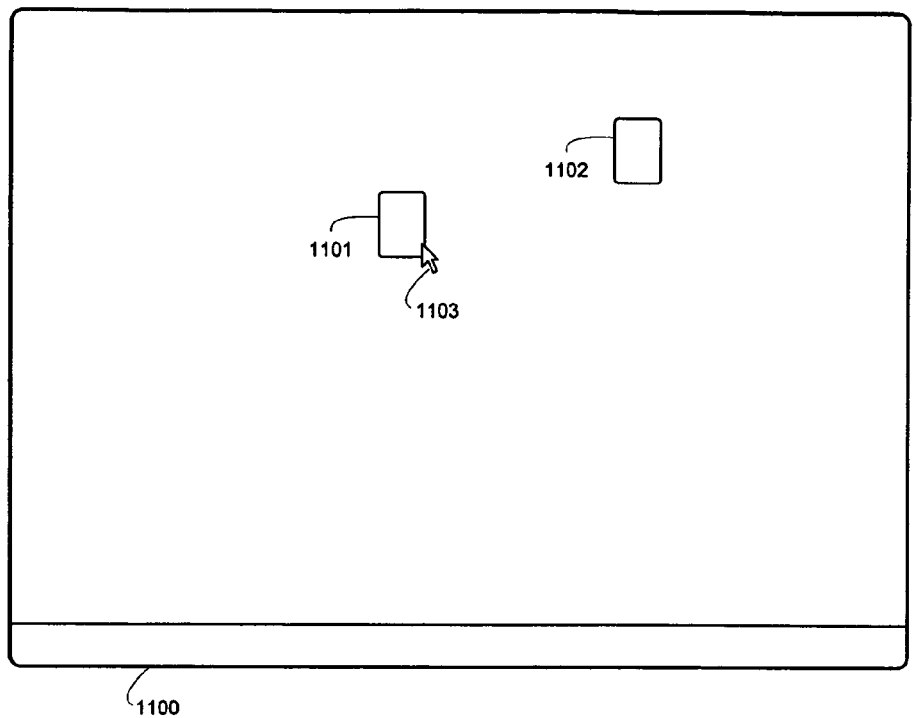
FIGS. 11-13 show illustrative screenshots where a drag/drop operation causes a preview feedback instance to be presented either near the cursor or in another location on the screen.
Figure 12:
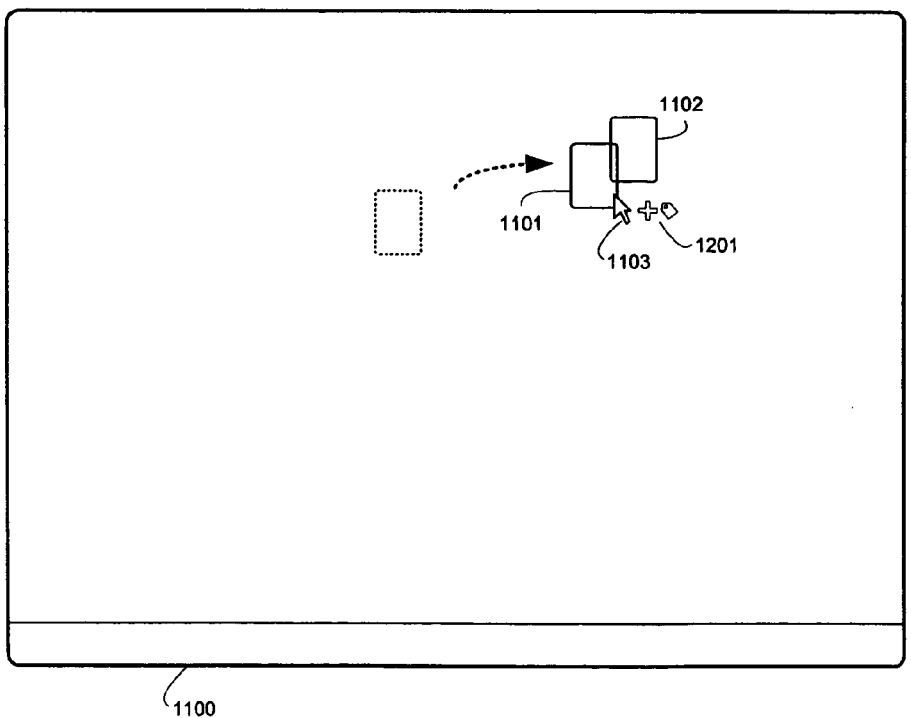
Figure 13:
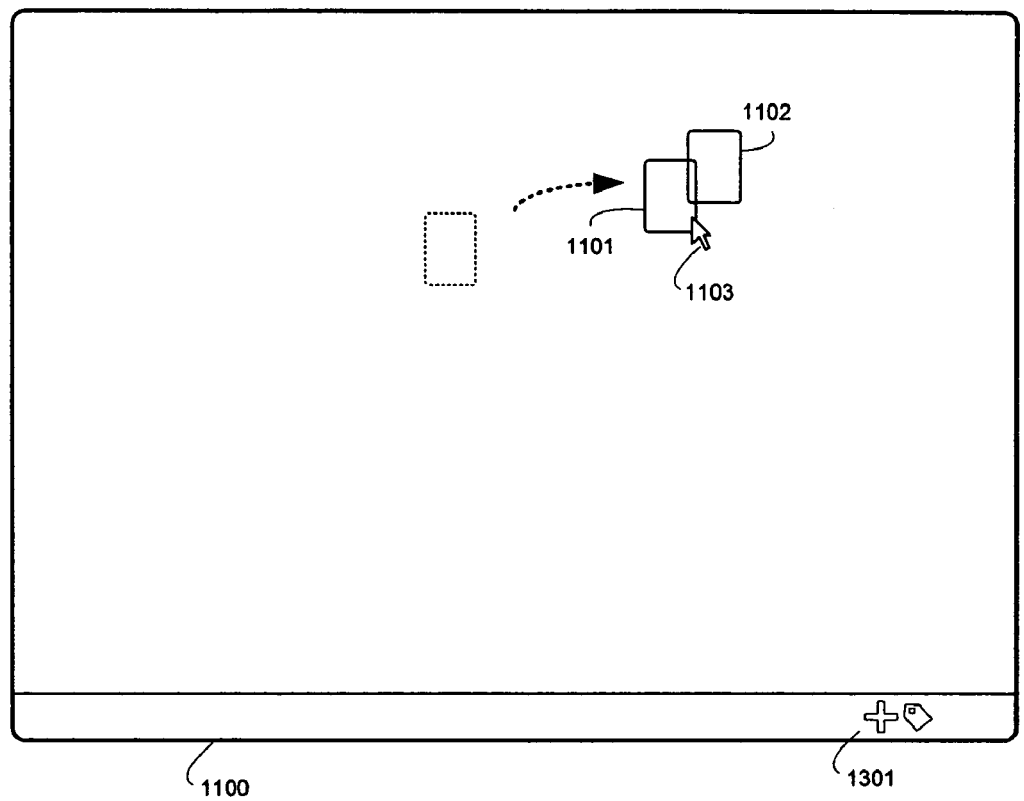

With the exception of the feedback shown in FIG. 5, each of these feedback instances may be presented to the user responsive to the selected object being moved proximate to (e.g., within a threshold distance of; or overlaying) the target. For instance, referring to FIG. 11, a screen 1100 is shown in which a user is about to drag a selected object 1101 over to a target object 1102 using cursor 1103. Referring to FIG. 12, selected object 1101 has now been dragged and is now proximate to (and indeed, in this case, overlaying) target object 1102. In response, feedback 1201 is presented proximate to cursor 1103. Alternatively, or additionally, with reference to FIG. 13, feedback 1301 may be presented in a location on screen 1100 unrelated to the position of cursor 1103, such as in a pre-existing status bar or in a pop-up window.

Figure 14:
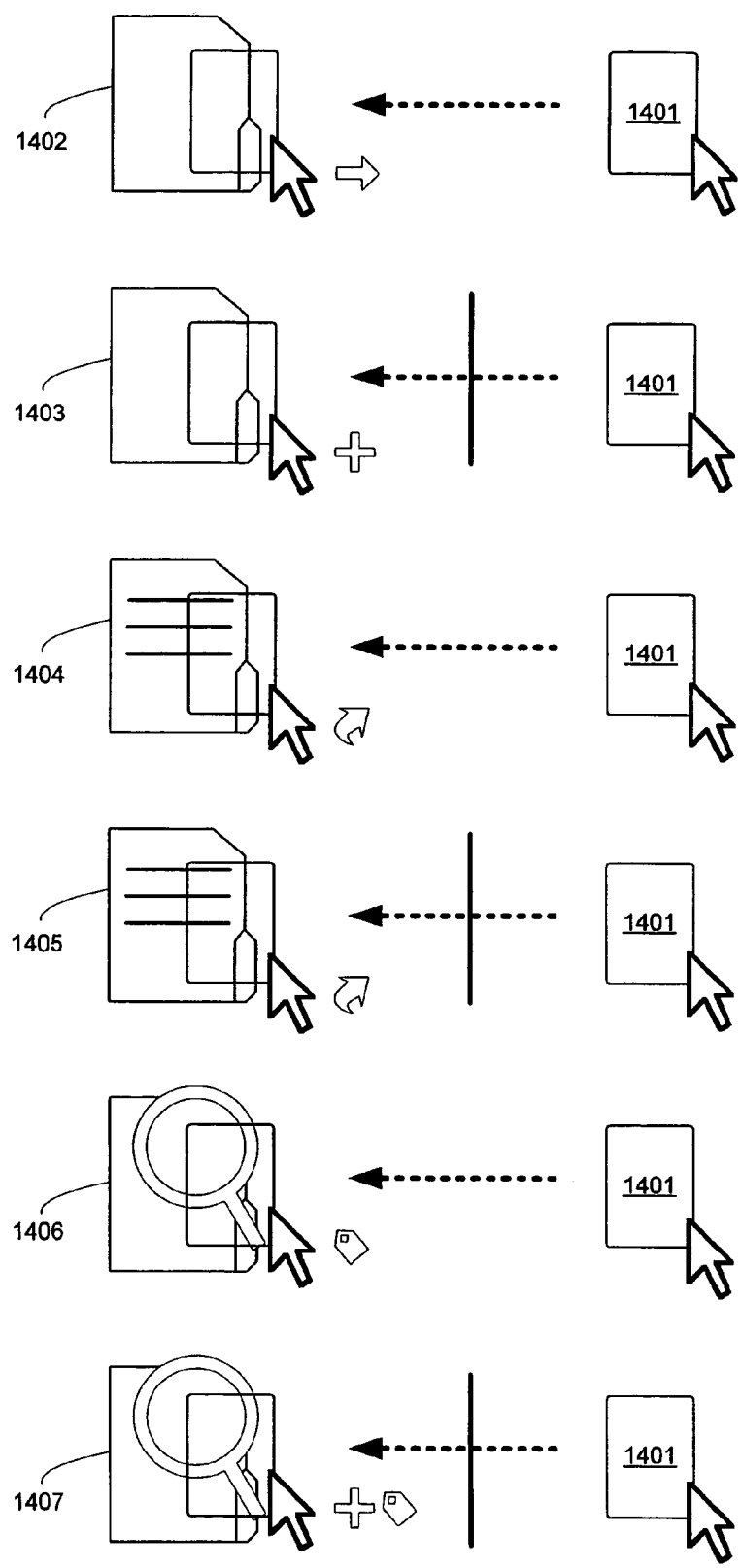
FIG. 14 shows illustrative preview feedback instances that may be presented in response to dragging an item over various types of target objects.
Figure 15:
FIGS. 15-18 show illustrative preview feedback instances that each include explanatory text.
Figure 16:

As already mentioned, the particular feedback provided to the user depends upon which action(s) are to be taken upon completion of the drag/drop operation. An example of feedback that may be provided is shown in FIG. 14, with reference to the "Item" row of the table in FIG. 2. Where an item 1401 is dragged over a folder 1402 in the same volume, feedback as in FIG. 9 is provided, indicating that item 1401 would be moved into folder 1402 upon dropping item 1401 there. Where item 1401 is dragged over a folder 1403 in a different volume, feedback as in FIG. 4 is provided, indicating that item 1401 would be copied into folder 1403 upon dropping item 1401 there. Where item 1401 is dragged over a list 1404 in the same volume, feedback as in FIG. 6 is provided, indicating that a reference to item 1401 would be added to list 1404 upon dropping item 1401 there. The same is indicated where item 1401 is dragged over a list 1405 in a different volume. Where item 1401 is dragged over a persisted auto-list 1405, and where item 1401 is within the scope of persisted auto-list 1405, feedback as in FIG. 7 is provided. Such feedback indicates that one or more properties of item 1401 will be modified such that item 1401 will be listed in persisted auto-list 1405, upon dropping item 1401 there. Where item 1401 is dragged over a persisted auto-list 1406, and where item 1401 is outside the scope of persisted auto-list 1405, feedback as in FIGS. 4 and 7 is provided. Such feedback indicates that item 1401 will be copied to a location within the scope, and that one or more properties of the copy of item 1401 will be modified such that the copy of item 1401 will be listed in persisted auto-list 1405, upon dropping item 1401 there.

Referring to FIGS. 15-18, the preview feedback may additionally or alternatively include a textual explanation that more fully explains details of each action to be taken. For example, the feedback instance in FIG. 15 indicates to the user that properties of the selected item will be changed, and in particular the labels "Projects" and "Work" will be added as intrinsic properties to the item. The feedback instance in FIG. 16 indicates to the user that the selected item will be copied and its properties will be modified, and in particular that the selected item will be copied to the location Desktop and the labels "Urgent" and "Personal" will be added as intrinsic properties to the selected item.

Figure 17:
Figure 18:
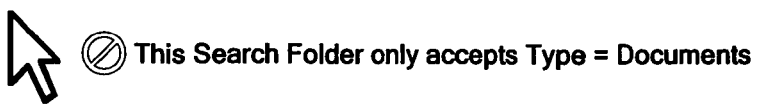

The feedback instance in FIG. 17 also provides detailed information to the user. In this case, the selected item will be copied to the location Client Work Folder, and various indicated labels will be added as properties to the item. It should be noted that, where the descriptive text becomes too long, as in FIG. 17, the text may fade away as shown. The feedback instance in FIG. 18 indicates not only that the drag/drop operation will not work, but also why it will not work. In this example, the operation will not work because a non-document is being dragged over a persisted auto-list defining a criteria that allows only documents to be referenced.

Dragging/Dropping Into Child Objects in a Hierarchy

Thus far it has been assumed that the target object has been displayed on the screen during dragging. However, all of the discussion herein may also apply to dragging to target objects that are children of such objects and that are not displayed on the screen at the beginning of a drag. For example, a main object, such as a folder, list, or persisted auto-list, may contain child objects. The user may desire to drop a selected object into one of the child objects even if only the main object is presently being displayed. This may be done as illustratively described with reference to FIGS. 19-23.

Figure 19:
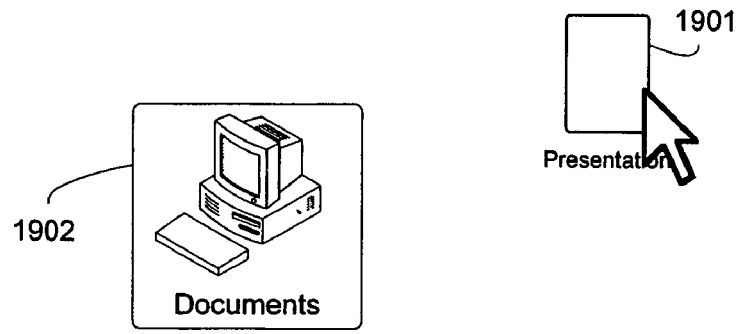
FIGS. 19-23 show an illustrative response to dragging an object over a target object having child objects below it in a hierarchy.
Figure 20:
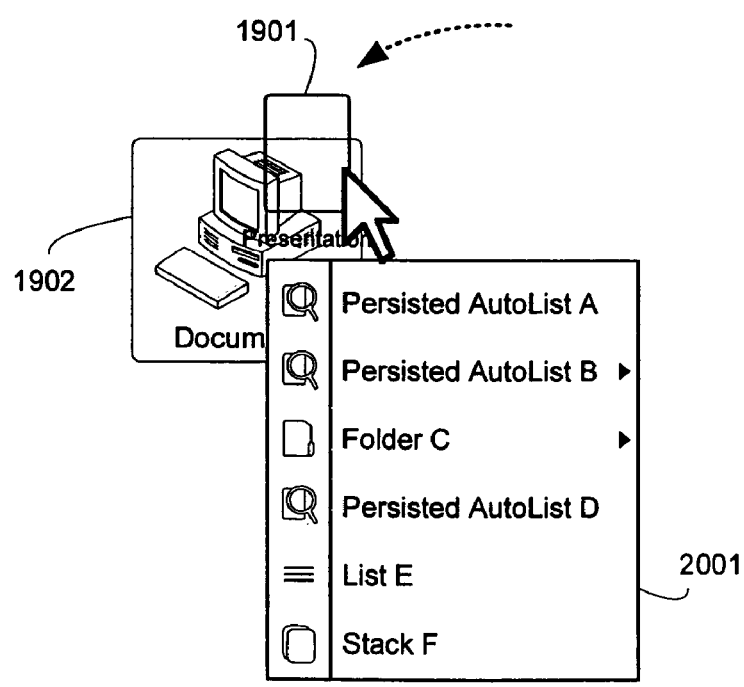
Figure 21:
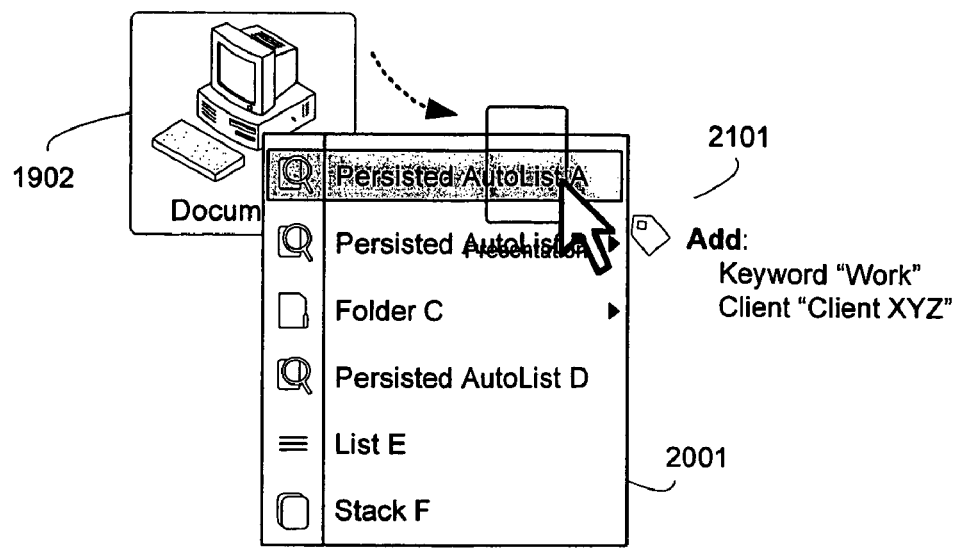

In FIG. 19, the user may select an object 1901 for dragging. Assume that the user decides to drop object 1901 onto a child object of folder 1902. Thus, referring to FIG. 20, the user drags object 1901 over folder 1902. In response, computer 100 displays a window 2001 listing the child objects contained within folder 1902. Referring to FIG. 21, the user may then drag object 1901 down over window 2001 to select a particular child object listed therein as desired. As object 1901 is dragged over each child object, appropriate preview feedback may be provided to the user. For example, as object 1901 is dragged over the first child object listed ("Persisted AutoList A"), a preview feedback 2101 indicating that, should object 1901 be dropped there, the properties of object 1901 would be modified to add "Work" to its Keyword property and "Client XYZ" to its Client property. This is likely because Persisted AutoList A defines criteria that require these properties of any object that is referenced by it.

Figure 22:
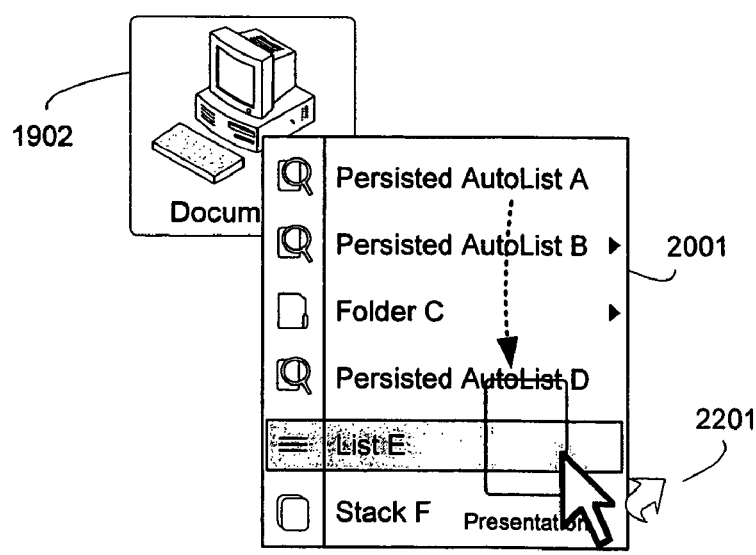
Figure 23:
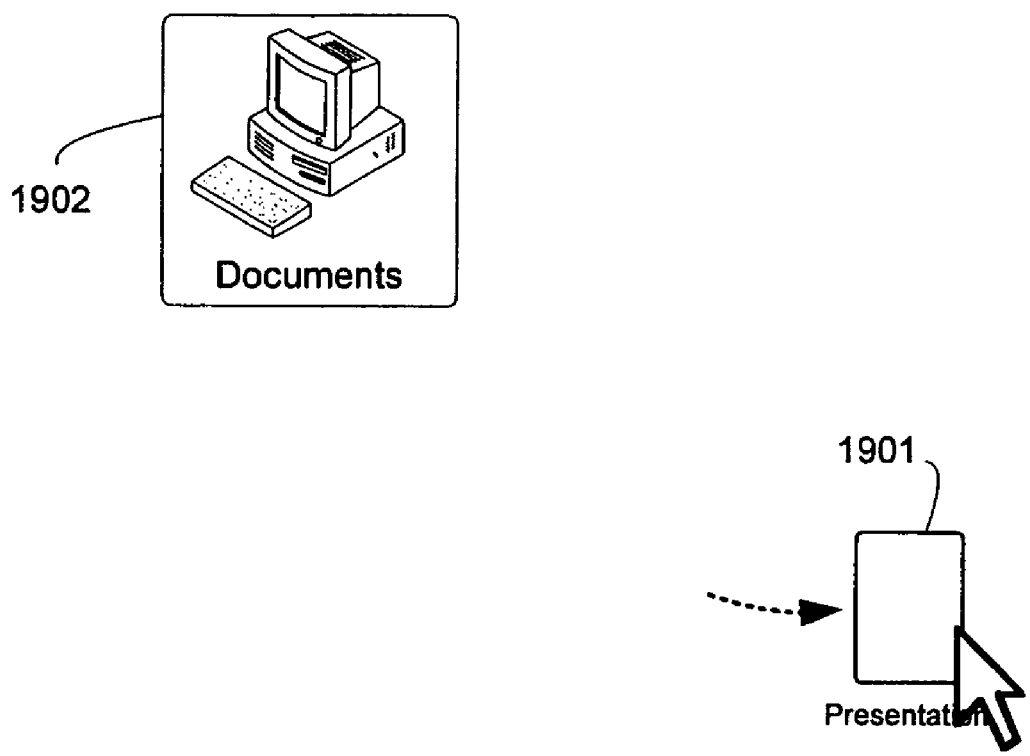

As the user continues to drag object 1901 down over window 2001, object 1901 may eventually be positioned over List E, as shown in FIG. 22. In this case, preview feedback 2201 is presented that indicates that object 1901 would be referenced by List E upon dropping object 1901 over it. The user may choose to do so. The user may alternatively choose not to drop object 1901 on any of the child objects shown in window 2001, and instead either abort the drag/drop or drag onto a completely different folder. In this case, user may drag object 1901 away from folder 1902 and window 2001, as shown in FIG. 23. As shown, in response to dragging object 1901 away from folder 1902 and/or window 2001, window 2001 automatically disappears. This may provide for a convenient way for the user to drop objects onto other objects located deep in a hierarchy without having to manually open and close container objects such as folder, lists, and persisted auto-lists.

CONCLUSION

Thus, an improved way of managing objects in an electronic file system has been described. In accordance with various aspects of the present disclosure, the drag/drop operation has become a powerful tool for dealing with the concepts of lists, persisted auto-lists, and stacks, for example. In addition, to deal with this increasing power and the complexity that goes with it, the user is now able to preview which of a number of different possible actions will be taken in response to a completed drag/drop operation.

What is claimed is:

1. A computer-readable storage medium storing computer-executable instructions for performing steps comprising:
responsive to detecting a first request to associate a first object with a folder in a graphical user interface, presenting to a user one of feedback that the first object will be moved into the folder or feedback that the first object will be copied into the folder as a result of the first request to associate the first object with the folder and either moving the first object into the folder or copying the first object into the folder;
responsive to detecting a second request to associate a second object with a list in the graphical user interface, presenting feedback to a user that a shortcut will be added to the second object in the list as a result of the second request to associate the second object with the list and adding a shortcut to the second object in the list; and
responsive to detecting a third request to associate a third object with a persisted auto-list in the graphical user interface, presenting feedback to a user that a property will be added, removed, or modified as a result of the third request to associate the third object with the persisted auto-list and conforming one of an intrinsic property associated with the third object or an intrinsic property of a copy of the third object in a manner that depends on a criterion defined by the persisted auto-list, wherein the persisted auto-list is a dynamic list containing a set of objects that meet one or more criteria associated with the list and wherein the set of objects in the persisted auto-list automatically changes in accordance with a change in properties of various objects and wherein the intrinsic property is a property that is stored with the item.

2. The computer-executable instructions of claim 1, wherein the third object is outside a scope of the persisted auto-list, wherein the step of conforming further includes copying the third object to generate the copy of the third object, and wherein the copy of the third object is located within the scope of the persisted auto-list.

3. The computer-executable instructions of claim 1, wherein the first, second, and third objects are each an item.

4. The computer-executable instructions of claim 1, wherein the first, second, and third objects are each a folder containing an item, and wherein the property is an intrinsic property of the item.

5. The computer-executable instructions of claim 1, wherein the first, second, and third objects are each a list referencing an item, and wherein the property is an intrinsic property of the item.

6. The computer-executable instructions of claim 1, wherein the first request is a drop operation of the first object onto the folder, the second request is a drop operation of the second object onto the list, and the third request is a drop operation of the third object onto the persisted auto-list.

7. The computer-executable instructions of claim 1, wherein the first request is a paste operation of the first object to the folder, the second request is a paste operation of the second object to the list, and the third request is a paste operation of the third object to the persisted auto-list.

8. The computer-executable instructions of claim 1, wherein the computer-executable instructions are further for:
   responsive to a drag operation of the first object over the folder, generating a first icon for display;
   responsive to a drag operation of the second object over the list, generating a second icon for display, wherein the second icon is different from the first icon; and
   responsive to a drag operation of the third object over the persisted auto-list, generating a third icon for display, wherein the third icon is different from the first and second icons.

9. A computing device comprising:
   one or more processing units; and
   a computer-readable storage medium coupled to the one or more processing units, the computer-readable storage medium storing computer- executable instructions that when executed by the one or more processing units perform operations comprising:
   (1) responsive to detecting a first request to associate a first object with a folder in a graphical user interface, presenting to a user one of feedback that the first object will be moved into the folder or feedback that the first object will be copied into the folder as a result of the first request to associate the first object with the folder and either moving the first object into the folder or copying the first object into the folder;
   (2) responsive to detecting a second request to associate a second object with a list in the graphical user interface, presenting feedback to a user that a shortcut will be added to the second object in the list as a result of the second request to associate the second object with the list and adding a shortcut to the second object in the list; and
   (3) responsive to detecting a third request to associate a third object with a persisted auto-list in the graphical user interface, presenting feedback to a user that a property will be added, removed, or modified as a result of the third request to associate the third object with the persisted auto-list and conforming one of an intrinsic property associated with the third object or an intrinsic property of a copy of the third object in a manner that depends on a criterion defined by the persisted auto-list, wherein the persisted auto-list is a dynamic list containing a set of objects that meet one or more criteria associated with the list and wherein the set of objects in the persisted auto-list automatically changes in accordance with a change in properties of various objects and wherein the intrinsic property is a property that is stored with the item.

10. The computing device of claim 9, wherein the third object is outside a scope of the persisted auto-list, wherein the step of conforming further includes copying the third object to generate the copy of the third object, and wherein the copy of the third object is located within the scope of the persisted auto-list.

11. The computing device of claim 9, wherein the first, second, and third objects are each an item.

12. The computing device of claim 9,
   wherein the first, second, and third objects are each a folder containing an item, and
   wherein the property is an intrinsic property of the item.

13. The computing device of claim 9,
   wherein the first, second, and third objects are each a list referencing an item, and
   wherein the property is an intrinsic property of the item.
   Image Page 17

14. The computing device of claim 9, wherein the first request is a drop operation of the first object onto the folder, the second request is a drop operation of the second object onto the list, and the third request is a drop operation of the third object onto the persisted auto-list.

15. The computing device of claim 9, wherein the first request is a paste operation of the first object to the folder, the second request is a paste operation of the second object to the list, and the third request is a paste operation of the third object to the persisted auto-list.

16. The computing device of claim 9, wherein the computer- executable instructions are further for:
   responsive to a drag operation of the first object over the folder, generating a first icon for display;
   responsive to a drag operation of the second object over the list, generating a second icon for display, wherein the second icon is different from the first icon; and
   responsive to a drag operation of the third object over the persisted auto- list, generating a third icon for display, wherein the third icon is different from the first and second icons.

* * * * *

UNITED STATES PATENT AND TRADEMARK OFFICE
CERTIFICATE OF CORRECTION

PATENT NO. : 7,650,575 B2  Page 1 of 1
APPLICATION NO. : 11/179804
DATED : January 19, 2010
INVENTOR(S) : Cummins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

Twenty-third Day of November, 2010

David J. Kappos
*Director of the United States Patent and Trademark Office*